United States Patent
Rajagopal et al.

(10) Patent No.: US 10,194,388 B2
(45) Date of Patent: Jan. 29, 2019

(54) METHOD AND APPARATUS TO ENABLE LOW POWER SYNCHRONIZATION FOR LARGE BANDWIDTH WIRELESS LAN SYSTEMS

(71) Applicant: Samsung Electronics Co., Ltd., Suwon-si, Gyeonggi-do (KR)

(72) Inventors: Sridhar Rajagopal, Plano, TX (US); Shadi Abu-Surra, Plano, TX (US); Eran Pisek, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 14/579,740

(22) Filed: Dec. 22, 2014

(65) Prior Publication Data
US 2015/0282068 A1 Oct. 1, 2015

Related U.S. Application Data

(60) Provisional application No. 61/973,079, filed on Mar. 31, 2014.

(51) Int. Cl.
*H04W 52/02* (2009.01)
*H04W 56/00* (2009.01)
(Continued)

(52) U.S. Cl.
CPC ....... *H04W 52/0206* (2013.01); *H04W 56/00* (2013.01); *H04W 84/12* (2013.01); *Y02B 60/50* (2013.01); *Y02D 70/00* (2018.01)

(58) Field of Classification Search
CPC . H04W 52/0206; H04W 56/00; H04W 84/12; Y02B 60/50
See application file for complete search history.

(56) References Cited

U.S. PATENT DOCUMENTS 7,277,040 B2 * 10/2007 Mazhar .............. H03M 1/1225
341/155
7,352,316 B2 * 4/2008 Hori .................... H03M 1/0626
341/155

(Continued)

FOREIGN PATENT DOCUMENTS

EP 2592804 A1 5/2013

OTHER PUBLICATIONS

Jin, et al.; "Idle Mode for Deep Power Save in IEEE 802.11 WLANs"; IEEE Journal of Communications and Networks; vol. 12 No. 5; Oct. 2010; pp. 480-491.

(Continued)

*Primary Examiner* — Alpus Hsu

(57) ABSTRACT

In a packet-based communication system, a transmitter and a receiver implement low power synchronization techniques. The transmitter transmits a packet that includes a two-part preamble. A first part of the two-part preamble is transmitted at a first reduced bandwidth that is smaller than a second bandwidth of the channel, and at least one of a second part of the two-part preamble and another portion of the packet is transmitted at the second bandwidth of the channel. The receiver includes an interleaved analog-to-digital converter (ADC) including multiple sub-ADCs. The receiver turns on a first subset of the multiple sub-ADCs during an idle listening period, and turns on a second subset of the multiple sub-ADCs upon detection of a completion of the first part of the two-part preamble, wherein the first subset of the multiple sub-ADCs is less than the second subset of the multiple sub-ADCs.

9 Claims, 11 Drawing Sheets

(51) Int. Cl.
*H04W 28/20* (2009.01)
*H04W 84/12* (2009.01)

(56) References Cited

U.S. PATENT DOCUMENTS

| | | | | |
|---|---|---|---|---|
| 7,551,114 | B2* | 6/2009 | Joy | H03M 1/002 |
| | | | | 341/122 |
| 7,756,002 | B2* | 7/2010 | Batra | H04B 1/7163 |
| | | | | 370/208 |
| 7,869,528 | B2* | 1/2011 | Robinson | H04B 1/0483 |
| | | | | 375/146 |
| 8,169,350 | B2* | 5/2012 | Oshima | H03M 1/122 |
| | | | | 341/120 |
| 8,193,956 | B2* | 6/2012 | Messier | H03M 1/1042 |
| | | | | 341/118 |
| 8,270,454 | B2 | 9/2012 | Sugaya | |
| 8,509,353 | B2* | 8/2013 | Han | H04B 1/001 |
| | | | | 341/143 |
| 8,611,483 | B2* | 12/2013 | Zhu | H04L 7/0334 |
| | | | | 341/122 |
| 8,705,604 | B2* | 4/2014 | Goodman | H04L 27/01 |
| | | | | 333/18 |
| 8,823,568 | B2* | 9/2014 | Cowley | H03M 1/662 |
| | | | | 341/144 |
| 8,928,507 | B2* | 1/2015 | Taluja | H03M 1/50 |
| | | | | 341/118 |
| 9,071,262 | B1* | 6/2015 | Malkin | H04B 17/21 |
| 9,172,386 | B2* | 10/2015 | Taluja | H03M 1/50 |
| 9,294,117 | B2* | 3/2016 | Pullela | H03M 1/50 |
| 9,698,863 | B2* | 7/2017 | Teplitsky | H04L 25/06 |
| 2006/0007908 | A1 | 1/2006 | Hosur et al. | |
| 2007/0147226 | A1 | 6/2007 | Khandekar et al. | |
| 2010/0067629 | A1 | 3/2010 | Gaddam et al. | |
| 2012/0195391 | A1 | 8/2012 | Zhang et al. | |
| 2012/0257558 | A1 | 10/2012 | Shin et al. | |
| 2013/0182593 | A1 | 7/2013 | Zhang et al. | |
| 2013/0329576 | A1 | 12/2013 | Sinha | |

OTHER PUBLICATIONS

Zhang, et al.; "E-MiLi: Energy-Minimizing Idle Listening in Wireless Networks"; IEEE Transactions on Mobile Computing; vol. 11 No. 9; Sep. 2012; pp. 1441-1454.

Li, et al.; "A 60 GHz Ultra Low-Power Wake-up Radio"; IEEE Radio and Wireless Symposium (RWS), Jan. 2011; pp. 343-346.

Ma, et al.; "A Low-Power Low-Cost Design of Primary Synchronization Signal Detection"; IEEE Transactions on Very Large Scale Integration (VLSI) Systems; vol. 20 No. 7; Jul. 2012; pp. 1161-1166.

International Search Report, dated Jun. 29, 2015, in connection with International Application No. PCT/KR2015/003190, 3 pages.

Written Opinion of the International Searching Authority, dated Jun. 29, 2015, in connection with International Application No. PCT/KR2015/003190, 6 pages.

European Patent Office Communication regarding Application No. 15772761.1, dated Nov. 5, 2018, 5 pages.

\* cited by examiner

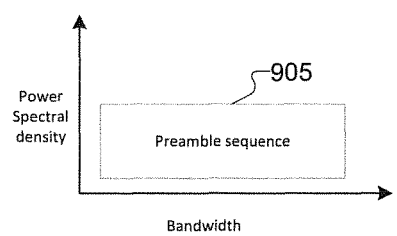
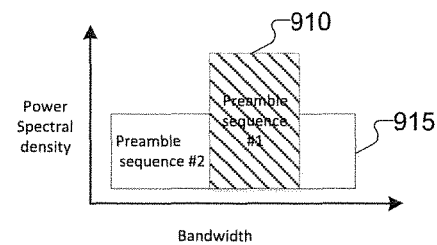
FIGURE 9A                FIGURE 9B
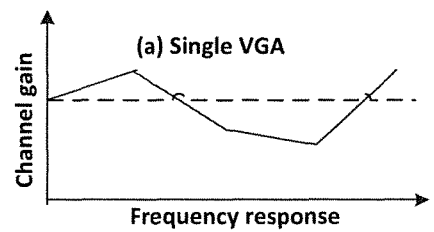
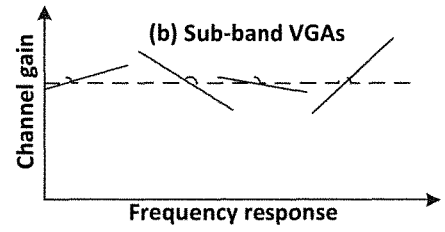
FIGURE 10A               FIGURE 10B
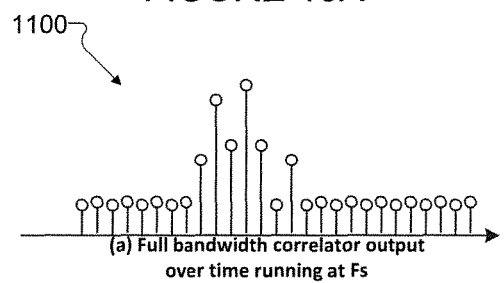
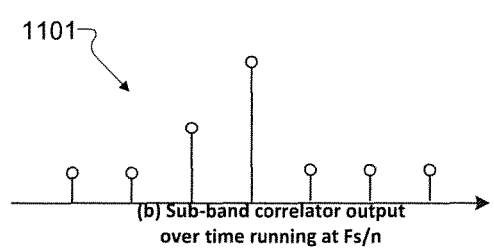
FIGURE 11A               FIGURE 11B

US 10,194,388 B2

METHOD AND APPARATUS TO ENABLE LOW POWER SYNCHRONIZATION FOR LARGE BANDWIDTH WIRELESS LAN SYSTEMS

CROSS-REFERENCE TO RELATED APPLICATION(S) AND CLAIM OF PRIORITY

The present application claims priority to U.S. Provisional Patent Application Ser. No. 61/973,079, filed Mar. 31, 2014, entitled "METHOD AND APPARATUS TO ENABLE LOW POWER SYNCHRONIZATION FOR LARGE BANDWIDTH WIRELESS LAN SYSTEMS". The content of the above-identified patent document is incorporated herein by reference.

TECHNICAL FIELD

The present application relates generally to physical layer design aspects in wireless communication systems and, more specifically, to synchronization in large bandwidth wireless local area network (LAN) systems.

BACKGROUND

Wireless LAN systems, such as those based on the Institute of Electrical and Electronics Engineers (IEEE) Standard 802.11, for example, are packet-based communication systems, where the entire information to be conveyed from the transmitter to the receiver is encoded in a packet. The packet includes a preamble that is used for synchronization, a header that provides information about the contents of the data, and a payload that contains the information to be transmitted. In current wireless local area network (LAN) systems, the preamble, header, and payload are time-multiplexed in a packet and occupy the entire channel bandwidth for transmission and reception.

In an unscheduled mode of operation using carrier sense multiple access with collision avoidance (CSMA/CA), wireless LAN devices, namely stations (STA), continuously look for unpredictably arriving packets in the receive mode or continuously assess a clear channel to determine when the device can transmit if the channel is clear. This unscheduled mode of operation, referred to as "idle listening", impacts power consumption due to the continuous scan for transmissions by the access point (AP) or other devices in the network. For large bandwidth systems (for example, gigahertz (GHz) of bandwidth), high-speed analog-to-digital converters (ADCs) are required for operation and can consume a significant portion of the idle listening mode power consumption.

SUMMARY

In a first embodiment, a method for implementing low power synchronization in a packet-based communication system is provided. The method includes transmitting a two-part preamble. A first part of the two-part preamble is transmitted at a reduced bandwidth that includes one or more sub-bands of a transmission bandwidth. The reduced bandwidth is less than a second transmission bandwidth used to transmit at least one of a second part of the two-part preamble and another portion of the packet.

In a second embodiment, a transmitter configured to communicate in a packet-based communication system is provided. The transmitter includes an antenna configured to transmit a packet. The packet includes a two-part preamble, a header and a payload. The transmitter includes processing circuitry coupled to the antenna. The processing circuitry is configured to vary a transmission bandwidth of the packet by transmitting a first part of the two-part preamble at a first reduced bandwidth comprising one or more sub-bands of a transmission bandwidth, wherein the reduced bandwidth is smaller than a second bandwidth of the channel, and transmitting at least one of a second part of the two-part preamble and another portion of the packet at the second bandwidth of the channel.

In a third embodiment, receiver configured to communicate in a packet-based communication system. The receiver includes an antenna configured to receive a packet. The packet includes a two-part preamble, a header and a payload. The receiver includes an interleaved analog-to-digital converter (ADC) including multiple sub-ADCs. The multiple sub-ADCs within the interleaved ADC are one of: time-interleaved sub-ADCs and frequency-interleaved sub-ADCs. The receiver also includes processing circuitry coupled to the antenna and the interleaved ADC. The processing circuitry is configured to turn on a first subset of the multiple sub-ADCs during an idle listening period, and turn on a second subset of the multiple sub-ADCs upon detection of a completion of the first part of the two-part preamble, wherein the first subset of the multiple sub-ADCs is less than the second subset of the multiple sub-ADCs.

In a fourth embodiment, receiver configured to communicate in a packet-based communication system. The receiver includes an antenna configured to receive a packet. The packet includes a preamble, a header and a payload at a full transmission bandwidth. The receiver also includes an interleaved analog-to-digital converter (ADC) including multiple sub-ADCs. The multiple sub-ADCs within the interleaved ADC are one of: time-interleaved sub-ADCs and frequency-interleaved sub-ADCs. The receiver further includes processing circuitry coupled to the antenna. The processing circuitry is configured to turn on a first subset of the multiple sub-ADCs and one or more correlators to capture only a fraction of the full transmission bandwidth during synchronization to save power in the idle listening mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is now made to the following description, taken in conjunction with the accompanying drawings, in which:

FIGS. 9A and 9B illustrate example graphs of power spectral density as a function of bandwidth output by a transmitting wireless communication device according to this disclosure;

FIGS. 10A and 10B illustrate example graphs of channel gain as a function of frequency response using single band and sub-band variable gain amplifiers (VGAs) within a client device according to this disclosure;

FIGS. 11A and 11B illustrate timelines of correlator output at various sampling frequencies according to this disclosure;

DETAILED DESCRIPTION

Figure 1:
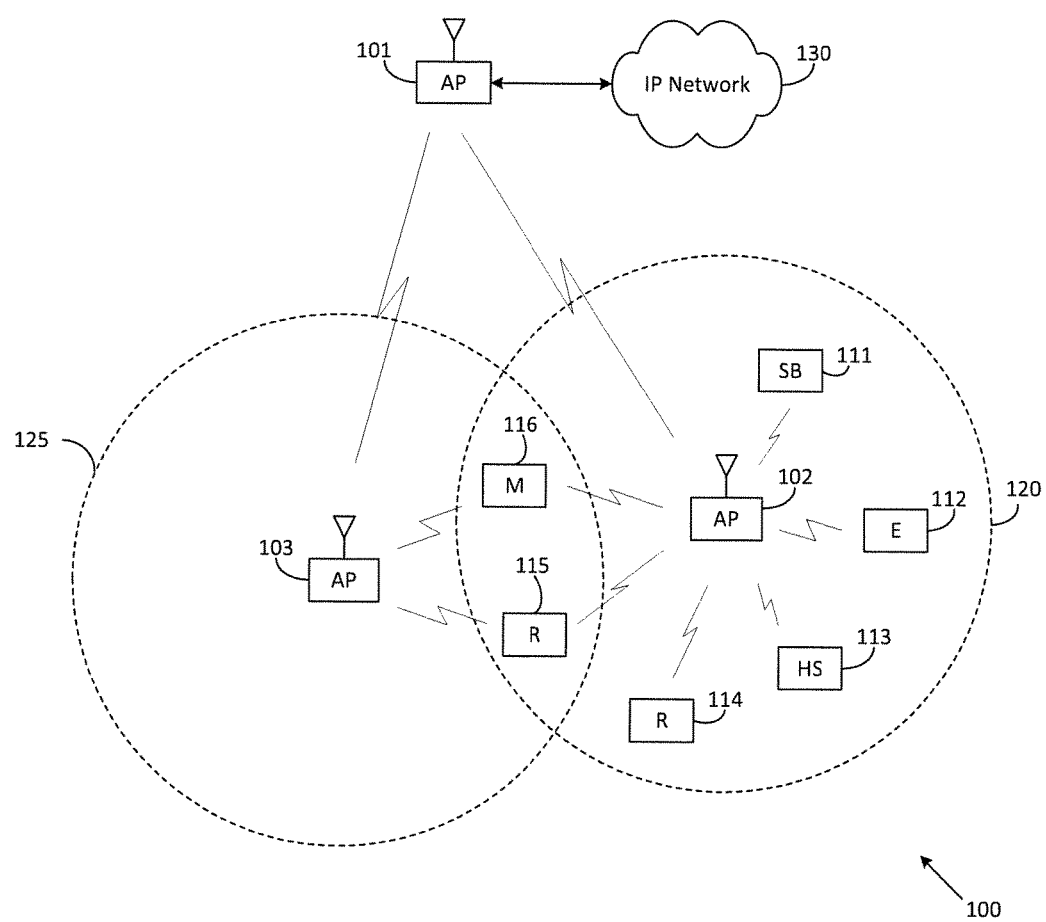
FIG. 1 illustrates an example wireless network according to this disclosure.

FIGS. 1 through 17, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

The following documents and standards descriptions are hereby incorporated into the present disclosure as if fully set forth herein: (i) S. Jin, K. Han, S. Choi, "Idle mode for deep power save in IEEE 802.11 WLANs," IEEE Journal of Communications and Networks, vol. 12, no. 5, pp. 480-491, October 2010 (hereinafter "REF1"); (ii) X. Zhang, K. G. Shin, "E-MiLi: Energy-Minimizing Idle Listening in Wireless Networks," IEEE Transactions on Mobile Computing, vol. 11, no. 9, pp. 1441-1454, September 2012 (hereinafter "REF2"); (iii) X. Li; P. Baltus, D. Milosevic, P. Zeijl, A. Roermund, "A 60 GHz ultra low-power wake-up radio," IEEE Radio and Wireless Symposium (RWS), pp. 343-346, January 2011 (hereinafter "REF3"); (iv) C. Ma, H. Cao, P. Lin, "A Low-Power Low-Cost Design of Primary Synchronization Signal Detection," IEEE Transactions on Very Large Scale Integration (VLSI) Systems, vol. 20, no. 7, pp. 1161-1166, July 2012 (hereinafter "REF4"); (v) Broadcom, Patent US 20130329576 A1: Novel methods for efficient power management in 60 Ghz devices (hereinafter "REF5"); and (vi) U.S. Patent Application Publication No. 2012/0257558 A1 titled Reducing Energy Consumption in Wireless Devices (hereinafter "REF6").

Wireless LAN systems started becoming popular in 1999 with the IEEE 802.11b standard providing data rates of 11 Mb/s. Over the last decade, wireless LAN systems have evolved to IEEE 802.11ac/ad standards that provide data rates close to 6-7 Gb/s in 2012, which is a factor of approximately 500 times improvement in data rates over the last 13 years and with an approximately 10 times increase in data rates every 5 years. Techniques such as OFDM (802.11a), MIMO (802.11n), MU-MIMO (802.11ac) and millimeter wave (mmWave) spectrum with large bandwidths (802.11ad) enabled this increase in data rate. The trend of increasing data rate requirements is expected to continue in the future based on the increase in mobile video traffic for smartphones and the development of new applications such as HD video. To provide the next leap in data rates, there is a growing focus to explore larger bandwidths and higher frequencies to instead of focusing on the physical layer design for achieving link capacity for a given bandwidth. However, compared the rate of grow in data rates, the battery capacity of mobile devices has gone up by only 5-10% every year, which is a factor of approximately 4 times in 15 years. Thus, power consumption at larger bandwidth and mmWave frequencies is one of the key technical challenges for successful commercialization of these high data rate systems.

For large bandwidth wireless LAN systems, such as mmWave systems at 60 GHz, for example, beamforming with directional transmissions are used for communication. The link between the AP and the device, namely a station (STA), can be fragile due to mobility and blockage in such systems. Hence, frequent beamforming training is implemented for maintaining the link between the AP and STA. The beamforming training involves repeated scanning in multiple directions, further increasing the need for idle listening and increasing receiver power consumption.

Wireless LAN is a carrier sense multiple access with collision avoidance (CSMA/CA) based system in which the wireless LAN client device constantly scans for, or looks to receive, packets that are transmitted unpredictably such that the client cannot predict when to commence receiving a packet. Also in the Wireless LAN system, the client device constantly assesses a clear channel when operating in idle listening mode. In idle listening mode, a client device receiver synchronization circuit, including the radio frequency (RF) and analog-to-digital converters (ADCs) remain active. The power consumption of high-speed ADCs used for large bandwidth systems are a significant portion of the idle mode power consumption. As a solution, embodiments of the present disclosure reduce the power consumption during idle listening.

Although wireless LAN systems have a power save mode in which the client devices can hibernate during data transmissions not assigned to the client devices (see REF1), the use of power save mode is limited in busy networks. The use of power save mode is especially limited in millimeter wave (mmW) 60 GHz systems where communication links can be fragile and the client device operations require frequent beamforming training and scanning for new paths to the AP.

Certain client devices can use low power wake-up radios to detect a preamble, but the low power wake-up radio is unreliable because beamforming circuitry in the radio frequency (RF) architecture is required to detect the preamble (See REF3). Certain ADCs with reduced bit precision, such as 1-bit precision, can be used to support low power synchronization and save power (See REF4). However, such ADCs with reduced bit precision save power can negatively impact performance and increase false alarms.

Certain down-clocking wireless LAN radios operate in idle listening mode such as E-MiLi (See REF2). A special preamble is pre-pended (namely, added to a beginning of the preamble) to an existing wireless LAN packet, and the client device can detect the special preamble even when the system is down-clocked. Down clocking the wireless LAN radios, namely, switching clock rates requires a switching delay to stabilize the phase locked loop (PLL) for the ADCs. Accordingly, dummy bits are required to accommodate this switching time and corresponding switching delay.

Embodiments of the present disclosure use an architecture of high speed ADCs that are composed from multiple sub-ADCs by operating the multiple sub-ADCs in a variable bandwidth mode during synchronization without any switching delay, additional preambles, or extended preambles. According to this disclosure, a variable bandwidth mode of operation can be implemented by a transmitting wireless network device transmitting a multiple bandwidth packet (such as a two-part preamble or reduced bandwidth payload), by the receiving wireless network device receiving the multiple bandwidth packet, or by both. More specifically, when a transmitting wireless network device, or a receiving wireless network device, turns OFF at least one sub-ADC, whether for idle listening mode or for transmitting/receiving a multiple bandwidth packet, that transmitting/receiving wireless network device operates in a "reduced bandwidth mode." For example, processing circuitry, such as a processing device 210 or main processor 340, turns on a first subset of the multiple sub-ADCs upon during an idle listening period and turns on a second subset of the multiple sub-ADCs upon detection of a completion of the first part of the two-part preamble, wherein the first subset of the multiple sub-ADCs is less than the second subset of the multiple sub-ADCs. The multiple sub-ADCs can operate, for example, in different time sampling intervals (referred to as time-interleaved ADCs) or across multiple frequency sub-bands (referred to as frequency interleaved ADCs). Note, as described above, a wireless network device, namely, an AP or a STA, can alternately be an AP when operating in an AP mode and then be a client device when operating in a STA mode. Accordingly, for convenience, the term "AP" additionally refers to a transmitting wireless network device (AP or STA), and the terms "STA" or "client device" additionally refers to a receiving wireless network device (AP or STA).

To implement the variable bandwidth mode, the AP or transmitting wireless network device generates and transmits a two-part preamble having a variable bandwidth, where a first part of the preamble (referred to as a sub-band preamble) is transmitted over reduced bandwidth, and where a subsequent part of the preamble (referred to as a full-band preamble) is transmitted over the entire, namely full, bandwidth. To implement the variable bandwidth mode in the client device or receiving wireless network device, during synchronization, all except one of the sub-ADCs within a high speed time-interleaved or frequency interleaved ADC are turned OFF until the end of the sub-band preamble. That is, during synchronization, only a single sub-ADC within the high speed ADC of the client device operates to receive the first part of the preamble, then upon receiving the end of the first part of the preamble, all of the sub-ADCs within the client device turn ON to receive the full-band second part of the preamble. Note that it is not essential to this disclosure that only one sub-ADC is kept ON during the first part of preamble transmission. In the general case, at least one sub-ADC of the client device (such as a receiving wireless network device) is turned OFF in the reduced bandwidth mode. Also, note that OFF does not imply that the sub-ADC is turned completely OFF without power. Instead, in the OFF mode, the sub-ADC can also be kept in a STANDBY mode where the power is still ON but the clocks are turned OFF, thereby enabling the sub-ADC to be turned ON quickly to change from the reduced bandwidth mode to the full bandwidth mode. Embodiments of the present disclosure can be used in conjunction with reduced bit-width and power save mode schemes. As a technical advantage, this disclosure provides a low power, variable bandwidth mode for synchronization, where the bandwidth is reduced during idle listening and is adapted during the synchronization process without any switching delay. As another technical advantage, this disclosure provides a bandwidth-scalable synchronization design that is applicable to future high bandwidth systems and compatible to current IEEE 802.11ad systems. As an example, embodiments of the present disclosure provide a backward compatible operating mode using a filtered Golay correlator matched to the sub-band reception of the transmitted full-band Golay sequence.

FIG. 1 illustrates an example network 100 wireless network 100 according to this disclosure. The embodiment of the network 100 wireless network 100 shown in FIG. 1 is for illustration only. Other embodiments of the network 100 wireless network 100 could be used without departing from the scope of this disclosure.

As shown in FIG. 1, the wireless network 100 includes an access point (AP) 101, an AP 102, and an AP 103. The AP 101 communicates with the AP 102 and the AP 103. The AP 101 also communicates with at least one Internet Protocol (IP) network 130, such as the Internet, a proprietary IP network, or other data network. The wireless network 100 includes the IP network 130 that facilitates communication between various components in the wireless network 100. For example, the IP network 130 can communicate Internet Protocol (IP) packets, frame relay frames, Asynchronous Transfer Mode (ATM) cells, or other information between network addresses. The IP network 130 includes one or more local area networks (LANs), metropolitan area networks (MANs), wide area networks (WANs), all or a portion of a global network such as the Internet, or any other communication system or systems at one or more locations.

Depending on the network type, other well-known terms may be used instead of "access point" or "AP," such as "base station" or "eNodeB" or "eNB." For the sake of convenience, the terms "access point" and "AP" are used in this patent document to refer to network infrastructure components that provide wireless access to remote terminals. Also, depending on the network type, other well-known terms may be used instead of "user equipment" or "UE," such as "mobile station," "STA," "subscriber station," "remote terminal," "wireless terminal," "user device," "client device," or "client." For the sake of convenience, the terms "client device" and "STA" are used in this patent document to refer to remote wireless equipment that wirelessly accesses an AP, whether the STA is a mobile device (such as a mobile telephone, smartphone, personal digital assistant (PDA), laptop computer, or tablet computer) or is normally considered a stationary device (such as a desktop computer or vending machine).

The AP 102 provides wireless broadband access to the network 130 for a first plurality of client devices (STAs) within a coverage area 120 of the AP 102. The first plurality of STAs includes a STA 111, which may be located in a small business (SB); a STA 112, which may be located in an enterprise (E); a STA 113, which may be located in a WiFi hotspot (HS); a STA 114, which may be located in a first residence (R); a STA 115, which may be located in a second residence (R); and a STA 116, which may be a mobile device (M) like a cell phone, a wireless laptop, a wireless PDA, or the like. The AP 103 provides wireless broadband access to the network 130 for a second plurality of STAs within a coverage area 125 of the AP 103. The second plurality of STAs includes the STA 115 and the STA 116. In some embodiments, one or more of the APs 101-103 may communicate with each other and with the STAs 111-116 using WiFi, WiGig, or other advanced wireless communication techniques. In some embodiments, one or more of the APs 101-103 can be implemented within a smartphone (or other transmitting device colloquially considered to be a "mobile device") such that a the smartphone implements functions of an IEEE 802.11 access point when operating in an AP mode (for example, a tethering mode) and implements functions of a client device (STA) when operating in a mobile station (STA) mode.

Each client device 111-116 represents any suitable computing or processing device that interacts with or communicates with at least one AP 101-103, such as IEEE 802.11 wireless access points, to access the IP network 130. One or more of the client devices 111-116 include a computing or processing devices that can include one or more processors, one or more controllers, a processor array, or any suitable processing circuitry, that can execute an algorithm, instructions or computer code to perform the functions described herein. In certain embodiments, one or more of the client devices 111-116, can act as an access point, such as an IEEE 802.11 access point, as described above in reference to the access point 103.

As described in more detail below, embodiments of the present disclosure provide a multiple bandwidth preamble to enable low power synchronization for large bandwidth wireless LAN systems. For example, one or more of client devices 111-116, access points 101-103, and IP network 130 include one or more processors, one or more controllers, a processor array, or any suitable processing circuitry, that can execute an algorithm, instructions or computer code to provide or support a multiple bandwidth preamble to enable low power synchronization for large bandwidth wireless LAN systems.

Although FIG. 1 illustrates one example of a wireless network 100, various changes may be made to FIG. 1. For example, the network 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
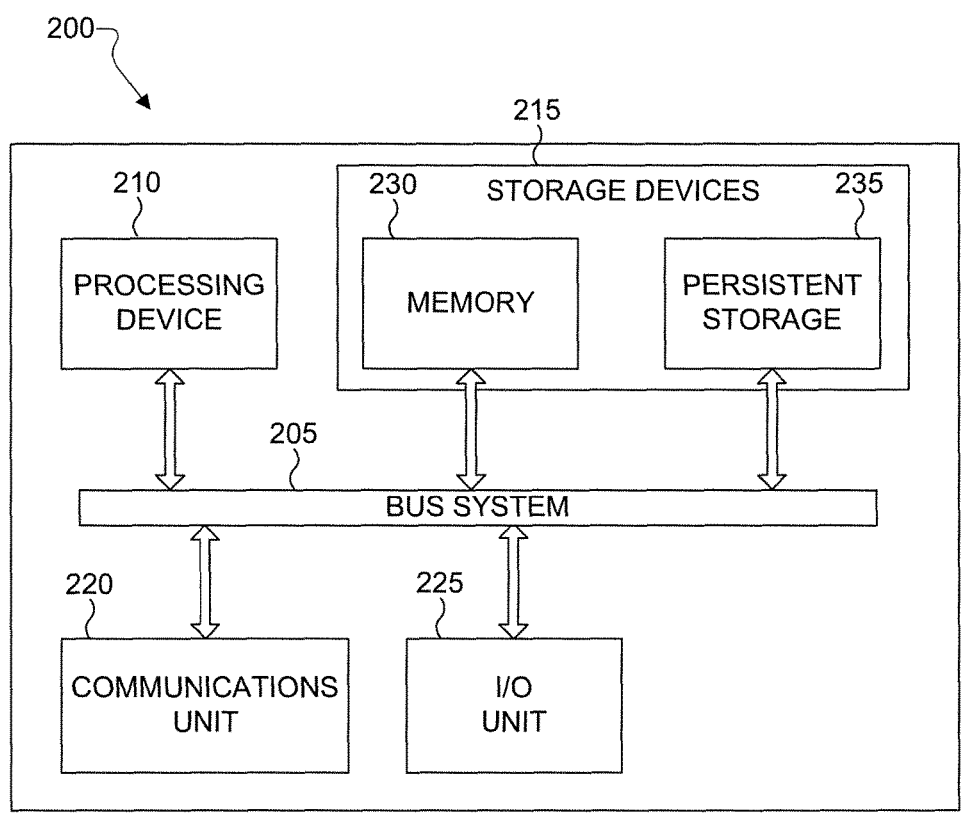
FIGS. 2 and 3 illustrate example devices in a computing system according to this disclosure.
Figure 3:
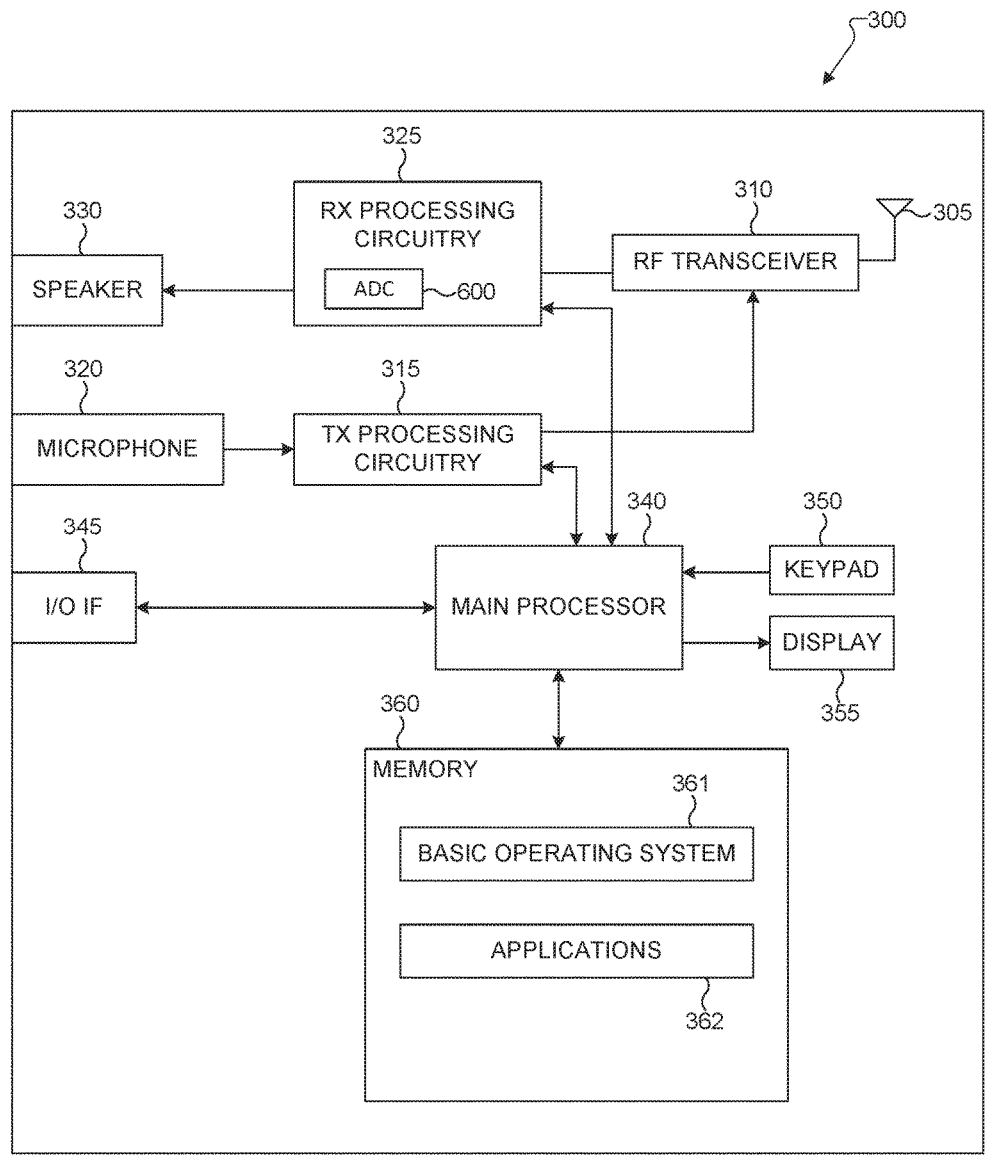

FIGS. 2 and 3 illustrate example devices in a computing system according to this disclosure. In particular, FIG. 2 illustrates an example access point 200, and FIG. 3 illustrates an example client device 300. The access point 200 could represent one or more of the access points 101-103 in FIG. 1, and the client device 300 could represent one of the client devices 111-116 in FIG. 1. Although described to represent one of the client devices 111-116, the remaining devices 111-116 can include the same, or similar, elements and processing circuitry as client device 300.

As shown in FIG. 2, the server 200 includes a bus system 205, at least one processing device 210, at least one storage device 215, at least one communications unit 220, and at least one input/output (I/O) unit 225. The bus system 205 that supports communication between the processing device 210, the storage device 215, the communications unit 220, and the input/output (I/O) unit 225

The processing device 210 executes instructions that are stored or can be loaded into a memory 230. The processing device 210 includes any suitable number(s) and type(s) of processors or other devices in any suitable arrangement. Example types of processing devices 210 include microprocessors, microcontrollers, digital signal processors, field programmable gate arrays, application specific integrated circuits, and discreet circuitry.

The memory 230 and a persistent storage 235 are examples of storage devices 215. The storage devices 215 represent any structure(s) capable of storing and facilitating retrieval of information (such as data, program code, and/or other suitable information on a temporary or permanent basis). The memory 230 represents a random access memory or any other suitable volatile or non-volatile storage device(s). The persistent storage 235 can contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 is described as representing the APs 101-103 of FIG. 1, the same or similar structure could be used in one or more of the client devices 111-116. For example, a laptop or desktop computer could have the same or similar structure as that shown in the AP 200 of FIG. 2.

In the example shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal, for example including a packet modulated thereon, transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal, for example using the ADC 600, which is described in further detail below. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the client device 300. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main prcessor 340 is also capable of executing other processes and programs resident in the memory 360, such as operations implementing a multiple bandwidth preamble to enable low power synchronization for large bandwidth wireless LAN systems. The main processor 340 can move data into or out of the memory 360 as required by an executing process. In some embodiments, the main processor 340 is configured to execute the applications 362 based on the OS program 361 or in response to signals received from external devices or an operator. The main processor 340 is also coupled to the I/O interface 345, which provides the client device 300 with the ability to connect to other devices such as laptop computers and handheld computers. The I/O interface 345 is the communication path between these accessories and the main controller 340.

The main processor 340 is also coupled to the keypad 350 and the display unit 355. The operator of the client device 300 can use the keypad 350 to enter data into the client device 300. The display 355 can be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

The use of increased bandwidth by channel bonding has been a significant contributor to the data rate increase in wireless LAN systems. There is a growing focus to explore even larger bandwidths and mmWave frequencies, such as 60 GHz, to provide the next leap in data rates. For example, discussions in 60 GHz IEEE 802.11ad evolution (referred to as Next Generation 60 (NG60)) are considering channel bonding to increase bandwidth from 2 gigahertz (GHz) to 6 GHz of bandwidth. Even at lower frequencies, in the 5 GHz band, IEEE 802.11ac includes channel bonding from 20 MHz to 160 MHz. As the bandwidth continues to increase, analog-to-digital converter (ADC) power consumption changes from a linear increase to a non-linear increase with the bandwidth (for example, quadratic to larger exponential increases, depending on the hardware architecture choice) above a certain bandwidth (currently, at around 500 MHz). That is, the power consumptions of ADCs operating at large bandwidths, such as 2-6 GHz, is a significant part of the receiver power consumption. As a result, if ADCs operate over the entire bandwidth, there will be a substantial increase in power consumption in idle listening mode. Also, devices consume a significant amount of power to process high data rates enabled by the large bandwidth operation.

According to embodiments of the present disclosure, not all communication modes during data communication require full bandwidth operation. For example, communication modes related to supporting data communication, such as control channel, acknowledgements, beamforming, feedback, synchronization, and the like, do not require full bandwidth operation. Specifically, the synchronization mode does not require full bandwidth operation. Accordingly, a client device or AP in the idle listening mode that scans for packets using full bandwidth wastes a significant amount of power. During the synchronization mode, the client device or AP scans to receive a preamble and uses the preamble information to synchronize, and then receives the transmitted header and payload data information.

Embodiments of the present disclosure reduce the idle listening mode power consumption for large bandwidth wireless LAN systems wherein a client device or AP power consumption is dominated by high speed ADCs used to actively scan for packets. According to embodiments of the present disclosure, the preamble is split or otherwise divided into multiple parts, including a first part that the AP transmits in a variable bandwidth mode and a subsequent part that the AP transmits in a full-channel bandwidth mode. Also, the client device receiver operates in a reduced bandwidth mode to receive the first part of the split preamble, which informs the client device of whether or not the packet is a valid transmission. That is, the AP and client device operate in a reduced bandwidth mode data transmission occurs, which enables low power operation in large bandwidth systems. Embodiments of the present disclosure can be used for IEEE802.11ad evolution (termed as NG60) or future large bandwidth wireless standards and are backward compatible with the IEEE 802.11ad standard and supports hardware reuse.

Figure 4:
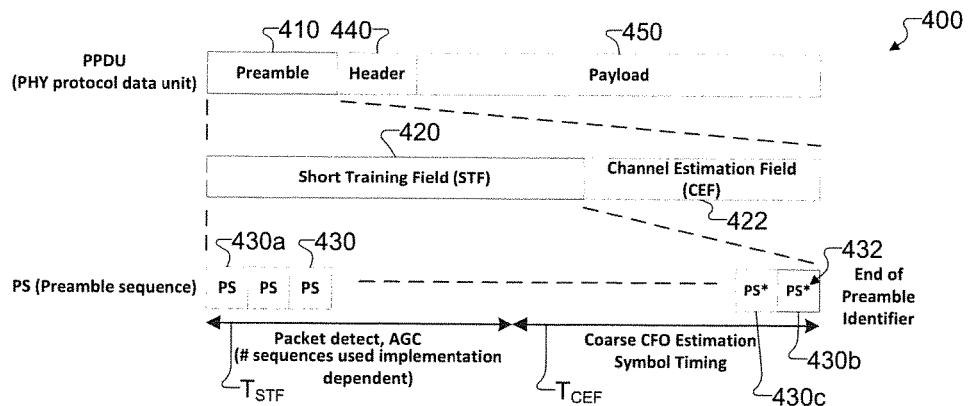
FIG. 4 illustrates a packet of wireless LAN system having a full bandwidth for each portion of the packet according to this disclosure.

FIG. 4 illustrates a packet of wireless LAN system having a full bandwidth for each portion of the packet according to the present disclosure. The embodiment of the packet 400 shown in FIG. 4 is for illustration only. Other embodiments could be used without departing from the scope of the present disclosure.

Wireless LAN systems are packet based, where each packet is a self-contained unit containing the preamble, header, and payload. The packet 400 (also referred to as the physical (PHY) protocol data unit (PPDU)) includes a preamble 410, a header 440 and a payload 450. In FIG. 4, the vertical dimension or height of a block represents bandwidth over which information within that block is transmitted. All the parts of the packet are transmitted over the same bandwidth. That is, the blocks representing header 440 and payload 450 have the same height as the block representing the preamble 410.

The preamble 410 provides synchronization information to the AP or client device in the form of a pattern. The pattern of synchronization information is used to adjust the gain of the signal and perform receiver timing and frequency offset alignment with the start of the header and data transmission, enabling the receiver to decode the header and payload correctly. The preamble 410 consists of two parts, a first sequence for detecting a signal and a second sequence for estimating a channel. That is, the packet preamble 410 includes a short training field 420 (STF) used for synchronization and a channel estimation field 422 (CEF) used for estimating and compensating the channel characteristics.

The STF 420 includes of multiple repetitions of a preamble sequence 430 (PS). That is, the AP transmits the first PS 430a at the beginning of the STF 420 and transmits the last PS 430b at the end of the STF 420. A client device uses the multiple repetitions for detecting packets, setting the automatic gain controller (AGC) gain for the low noise amplifier (LNA) and variable gain amplifier (VGA), coarse carrier frequency offset (CFO) estimation, and for symbol timing. The number of PS 430 repetitions is specified in the communication standard. For IEEE 802.11ad, there are two repetition lengths for the PS 430 depending on the operating mode. Control information uses forty repetitions of the PS 430 and is used for low SNR operation during beam training and beam width adaptation. The data transmissions, after beamforming, use 15 repetitions of the PS 430. In IEEE 802.11ad, 128-length Golay sequences are used for PS 430 due to its good auto-correlation property and simple correlator structure. The correlator is composed from adders and shifters, and no complex number multipliers are required. The PS 430 repetitions are terminated by an "end of preamble" marker 432 because the receiver may miss or fail to receive the first few PS 430 transmissions due to insufficient averaging and non-ideal gain setting. The end of preamble marker 432 may be designed by simply inverting the preamble PS 430 repetitions shown as 430b, for example, and may also be repeated as shown in 430c. Accordingly, the last PS 430b includes an end of preamble identifier 432 to indicate the end of the number of sequences used in the STF 420 and to indicate that the next information is the CEF 422, which is the second sequence of the preamble 410 for estimating the channel.

The receiver uses the AGC circuit to adjust the power of the signals received from the transmitting wireless device to make sure that the signals processed by the receiver are in the correct operating range for operating the ADC.

As an example of PS 430, Golay sequences can be used for preamble repetitions. The Golay sequences are generated in the time-domain using the following recursive process:

$$A_0(n)=\delta(n) \tag{1}$$

$$B_0(n)=\delta(n) \tag{2}$$

$$A_k(n)=W_k(n)A_{k-1}(n)+B_{k-1}(n-D_k) \tag{3}$$

$$B_k(n)=W_k(n)A_{k-1}(n)-B_{k-1}(n-D_k) \tag{4}$$

The 128-length Golay sequences $Ga_{128}$ and $Gb_{128}$ used for the PS 430 are generated using: $Ga_{128}(n)=A_7(128-n)$, $Gb_{128}(n)=B_7(128-n)$, $D_k=[1\ 8\ 2\ 4\ 16\ 32\ 64]$ (k=1, 2, ..., 7), and $W_k=[-1-1-1-1+1-1-1]$.

Figure 5:
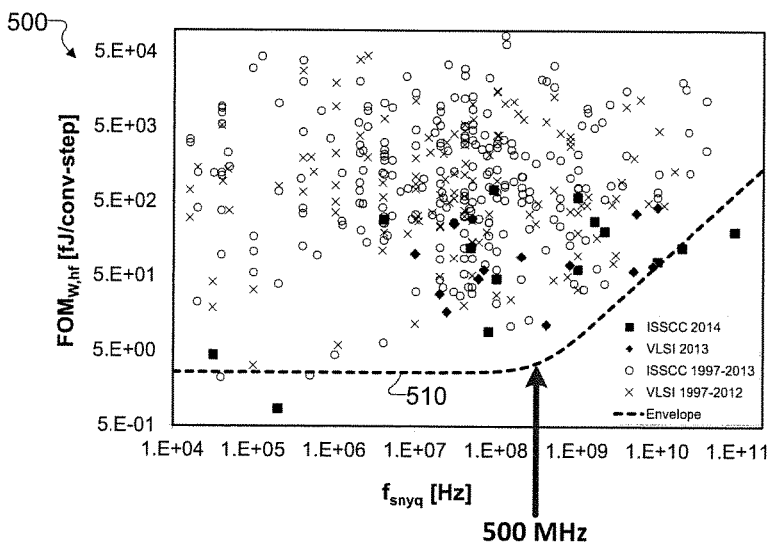
FIG. 5 illustrates Walden figure of merit (FOM) of all ADCs published at ISSCC and VLSI conferences from 1997 to 2014 as a function of the Nyquist sampling frequency ($f_{snyq}$)

FIG. 5 illustrates a Walden figure-of-merit ($FOM_W$) of all ADCs published at ISSCC and VLSI conferences from 1997 to 2014 as a function of the Nyquist sampling frequency ($f_{snyq}$). A Walden figure-of-merit ($FOM_W$) is typically used to evaluate ADC power efficiency and normalizes the power consumption P by the sampling frequency $f_s$ and effective number of bits (ENOB), given by $FOM_W=P/f_s2^{ENOB}$. The graph 500 shown in FIG. 5 is for illustration only.

In large bandwidth systems, typical interleaving techniques in time or frequency employ multiple low power sub-ADCs in order to scale the operational bandwidth of the ADCs in a low power manner. Even using the interleaving techniques, FIG. 5 shows that power efficiency of current ADCs starts degrading above a Nyquist sampling frequency ($f_{snyq}$) of a few 100 MHz. The envelope line 510 shows that the FOM is constant with increasing sampling frequency until approximately 500 MHz, beyond which the FOM starts increasing. The graph 500 shows that high speed ADCs operating at multiple giga-samples per second (Gs/s) in the receiver of the client device can consume a significant amount of power. Hence, techniques to reduce ADC operating bandwidth will help reduce power consumption.

Figure 6:
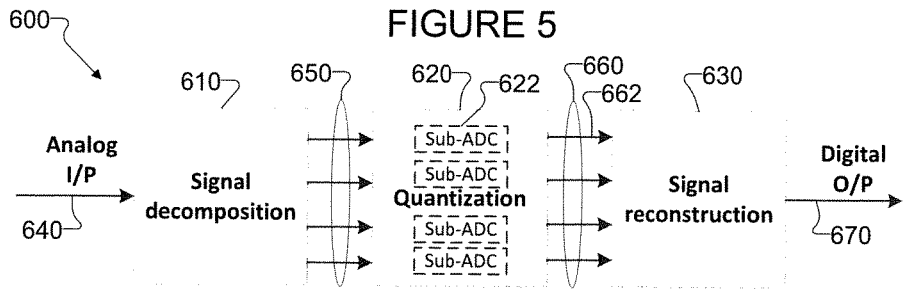
FIG. 6 illustrates an ADC architectures for large bandwidth systems using sub-ADCs according to this disclosure.

FIG. 6 illustrates an ADC architecture for large bandwidth systems using sub-ADCs to reduce ADC operating bandwidth according to embodiments of the present disclosure. The embodiment of the high speed ADC 600 shown in FIG. 6 is for illustration only. Other embodiments could be used without departing from the scope of the present disclosure. The ADC can be implemented in the access point 102 or in the client devices 111-116.

The power consumption of a high-speed ADC 600 depends on the bit-precision, sampling frequency, and other factors such as spurious free dynamic range. The ADC 600 includes a signal decomposition module 610, a quantization module 620, and a signal reconstruction module 630. The ADC 600 receives analog signals 640, for example including a packet modulated thereon, at an input. In certain embodiments, the ADC 600 is a time-interleaved ADC that samples and holds the input signal 640 at different phases of a full sampling frequency clock, quantizes each signal in a reduced bandwidth and then uses a fast multiplexing switch to reconstruct the full bandwidth signal. In other embodiments, the ADC 600 is a frequency interleaved ADC that operates by splitting the input signal 640 into narrower sub-bands using mixers and low pass filters or using band pass filters and under-sampling. That is, the full transmission bandwidth can include, or be divided into, multiple sub-bands. The tradeoffs of time and frequency interleaved ADCs are summarized in Table 1.

TABLE 1

Tradeoffs between different high speed ADC architectures

| Type | Decomposition | Reconstruction | Limitations |
|---|---|---|---|
| Time interleaved | Sample & Hold | Fast multiplexing switch | Calibration & Scalability |
| Frequency interleaved | Mixers w/LPF Or BPF | Upsample w/ digital filtering | Harmonics & Sub-band leakage |

The ADC 600 receives the analog input signal 640 at the signal decomposition module 610. The signal decomposition module 610 sub-samples the analog input signal 640 in the time domain or in the frequency domain. That is, the signal decomposition module 610 decomposes the full bandwidth analog input signal 640 into reduced bandwidth analog signals 650.

The quantization module 620 receives the analog samples 650 and quantizes the sub-sampled analog signal into a digital signal. That is, the quantization module 620 includes multiple sub-ADCs 622 that each output a digital signal. For example, when the ADC 600 is a frequency interleaved embodiment, the analog samples 650 include a sub-band (that is, a portion) of the analog input signal 640 for each sub-ADC 622 within the quantization module 620, and each sub-ADC 622 converts the respective portion of the analog samples 650 from analog to digital format. The quantization module 620 outputs a digital signal 660 that includes outputs from the sub-ADCs. For example, when the quantization module 620 includes four sub-ADCs 622, the digital signal 660 includes four digital sub-signals 662 output from each of the sub-ADCs 622.

The reconstruction module 630 receives the digital signal 660 and reconstructs a full bandwidth digital signal 670 from the subsampled signal. That is, the reconstruction module 630 uses the individual digital sub-signals 662 that are output from each of the sub-ADCs 622 to construct the full bandwidth digital signal 670. The digital signal 670 is a digital representation of the analog input signal 640.

Figure 7:
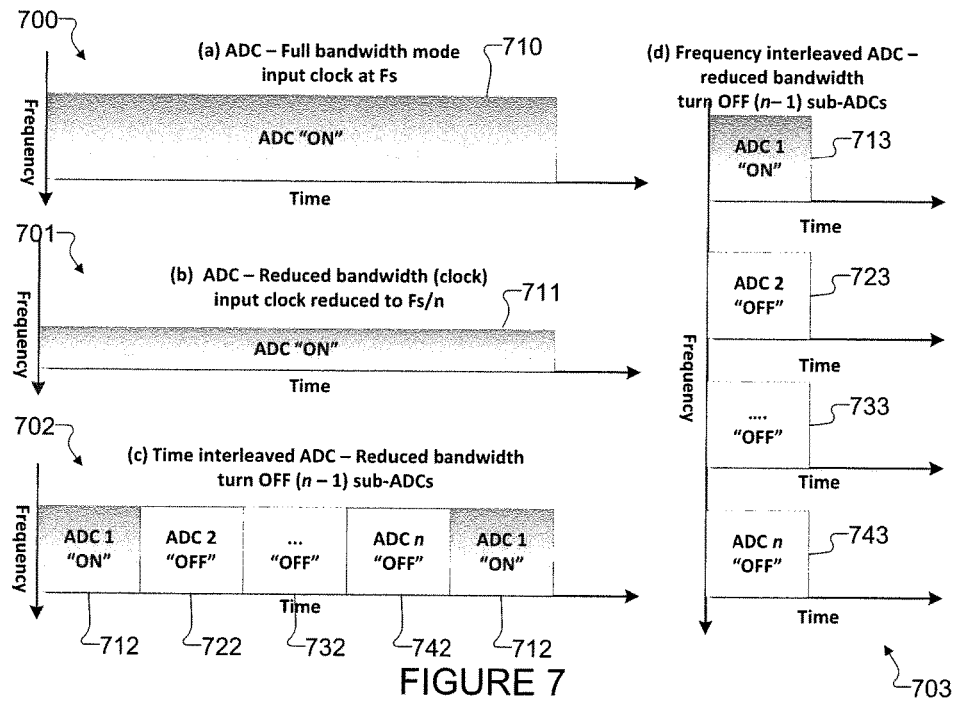
FIG. 7 illustrates example graphs of ADC operation in a reduced bandwidth mode according to this disclosure.

FIG. 7 illustrates example graphs of ADC operation in a variable bandwidth mode according to embodiments of the present disclosure. The embodiments of the graphs 700-701 shown in FIG. 7 are for illustration only. Other embodiments could be used without departing from the scope of the present disclosure. In the example shown in FIG. 7, the high-speed ADC includes n sub-ADCs, and the variable bandwidth mode uses $F_s/n$ bandwidth, where $F_s$ is the original Nyquist sampling frequency of the high-speed ADC. The graphs 700-701 illustrate various operations within a client device receiver structure, such as within the client device 112.

The graph 700 shows an ADC operating in a full bandwidth mode with an input clock at $F_s$. The horizontal axis represents time, and the vertical axis represents frequency (operating bandwidth). The height of the block 710 indicates the full bandwidth of an ADC. For example, all of the sub-ADCs within the ADC are turned ON during the block 710. The ADC does not save power when operating in the full bandwidth mode with the input clock at $F_s$.

The graph 701 shows an ADC operating in a reduced bandwidth mode with a reduced input clock that is reduced to $F_s/n$. The number n represents the total number of sub-ADCs within the ADC. The horizontal axis represents time, and the vertical axis represents frequency. The height of the block 711 is shorter than the height of the block 710. The reduced height of block 711 indicates the reduced bandwidth of the ADC. Block 711 still uses a single ADC but operates that single ADC in the reduced bandwidth mode by turning down the sampling clock to the ADC, referred to as down-clocking. Down-clocking provides a linear reduction of power consumption with a reduction in frequency. However, in order to change the bandwidth or to change the speed of the input clock, an ADC implementing down-clocking requires additional settling time for the PLL and synthesizers.

The graph 702 shows a time interleaved high-speed ADC operating in a variable bandwidth mode that uses only 1 sub-ADC, keeping the remaining sub-ADCs turned OFF. That is, the interleaved high-speed ADC operating in a variable bandwidth mode by turning OFF all except one of the total number (n) of sub-ADCs within the time interleaved high-speed ADC. For example, when the time interleaved high speed ADC includes four sub-ADCs (i.e., n=4), the shaded block 712 shows that a first sub-ADC (ADC1) turns ON during a first period and turns OFF during the next three periods. The unshaded blocks 722, 732, 742 show that a respective second sub-ADC (ADC2), a third sub-ADC, and a fourth sub-ADC (ADCn) are turned OFF during respective second, third, and fourth periods. The block 732 represents sub-ADCs subsequent to the second sub-ADC (ADC2) through a penultimate sub-ADC. The horizontal axis represents time, and the vertical axis represents frequency. The height of the block 712 is the same height of the block 710, which indicates the full bandwidth of the sub-ADCs. The high-speed ADC reduces its power consumption by time-interleaving while turning ON only one sub-ADC every 1/n periods and while keeping the remaining (n−1) sub-ADCs turned OFF during the n periods of the high-speed ADC. In this embodiment of the time interleaved high-speed ADC, the PLL/clock for the sub-ADCs does not need to be adapted. Also, "OFF" does not mean "no voltage" but rather a "standby or sleep" mode where the sub-ADCs can be turned "ON" quickly without recalibration. The "standby or sleep" mode of the sub-ADCs can be implemented, for example, by clock gating the sub-ADCs. In certain embodiments, the power consumption in the "OFF"

mode of the sub-ADCs is 10% of the active power to account for the interleaving overhead.

The graph 703 shows a frequency interleaved high-speed ADC operating in a reduced bandwidth mode that uses only 1 sub-ADC, keeping the remaining sub-ADCs turned OFF. The horizontal axis represents time, and the vertical axis represents frequency. The high-speed ADC reduces its power consumption by frequency interleaving while turning ON only one sub-ADC during the idle listening mode and while keeping the remaining (n−1) sub-ADCs turned OFF during the idle listening mode of the high-speed ADC. For example, a combined height of the blocks 713, 723, 733, 743 is the same as a height of the block 710, which indicates that each sub-ADC converts a sub-band of the full-bandwidth of the frequency interleaved high-speed ADC. More particularly, the individual heights of the blocks 713, 723, 733, 743 represent that each sub-ADC operates at its full-bandwidth, wherein the full bandwidth of a sub-ADC is a portion (or a sub-band) of the full bandwidth of the frequency interleaved high-speed ADC that includes the sub-ADCs (ADC1, ADC2 . . . ADCn).

Figure 8:
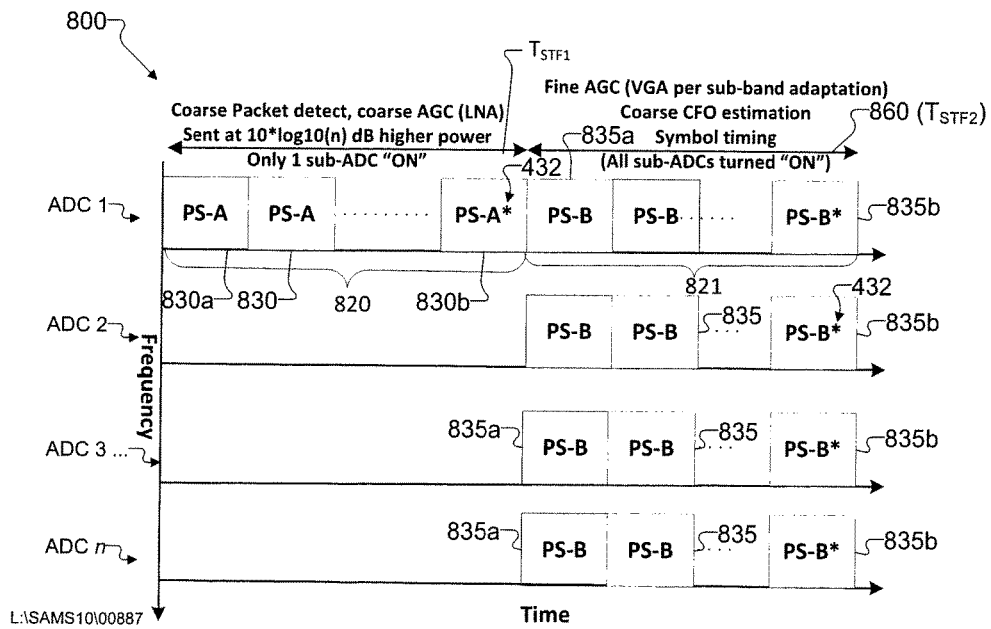
FIG. 8 illustrates a timing diagram of split preamble for reduced bandwidth operation during receive mode according to this disclosure.

FIG. 8 illustrates a timing diagram of a split STF part of a split preamble for reduced bandwidth operation during idle listening mode according to embodiments of the present disclosure. The embodiment of the timing diagram of the split STF 800 shown in FIG. 8 is for illustration only. Other embodiments could be used without departing from the scope of the present disclosure. The split STF 800 shows various operations of an access point transmitter structure, such as within the access point 118.

The horizontal axis represents time, and the vertical axis represents frequency. The each timeline represents signals received by a different sub-ADC within the high-speed interleaved ADC. For example, when the high-speed interleaved ADC includes four sub-ADCs (n=4), the top timeline represents signals received by the first sub-ADC (ADC1) within the high-speed interleaved ADC. The second, third, and bottom timelines represent signals received by respective the second (ADC2), third (ADC3 . . . ), and last sub-ADCs (ADCn) within the high-speed interleaved ADC.

The STF 800 consists of two parts, a first preamble sequence 820 for detecting a low bandwidth signal and a second preamble sequence 821 for enabling a full-bandwidth adaptation after the low bandwidth signal is detected. The second sequence 822 can be followed by a full-bandwidth CEF (not shown in the figure) for estimating and compensating the channel characteristics. That is, during reception of the second preamble sequence 821, the client device transitions from the reduced bandwidth mode to the full bandwidth mode such that at the end of the second preamble sequence 821, the client device operates in the full bandwidth mode to commence receiving the CEF.

The STF first preamble sequence 820 is a sub-band preamble used to support idle mode listening. When the client device detects energy in the sub-band corresponding to the STF first preamble sequence 820, the LNA is first adapted. The access point transmits the STF first preamble sequence 820 at 10*log 10(n) decibels (dB) higher power than the transmit power of the second preamble sequence 821 in order to keep the total band power the same (i.e., same communication range) when all sub-ADCs are turned "ON" during the second preamble sequence 821. The STF first preamble sequence 820 includes of a first set of multiple repetitions of a preamble sequence 830 (PS-A). The preamble sequence 830 (PS-A) is the same as or similar to preamble sequence 430 (PS). That is, the AP transmits the first PS-A 830a at the beginning of the STF 420 and transmits the last PS-B 835b at the end of the STF 420. The PS 830 repetitions are terminated by an "end of preamble sequence" marker 432, which can indicate commencement of the transitions to full bandwidth mode. The STF first preamble sequence 820 corresponds to a course AGC or coarse LNA, and coarse packet detection.

The STF second preamble sequence 821 is part of the full-band preamble used for fine VGA adaptation on all bands, coarse CFO, and symbol timing estimation. That is, the second preamble sequence 821 corresponds to a coarse CFO estimation, a fine AGC or VGA per sub-band adaptation, and a symbol timing. All sub-band preambles are transmitted in synchronization in the full-band preamble. That is, the access point turns ON all of the n number of sub-ADCs to transmit the second preamble sequence 821 at full bandwidth. The STF 800 includes of a second set of multiple repetitions of a preamble sequence 835 (PS-B). The preamble sequence 835 (PS-B) is the same as or similar to a preamble sequence PS 430. That is, the AP transmits the first PS-B 835a at the beginning of the STF second preamble sequence 821 and transmits the last PS-B 835b at the end of the second preamble sequence 821. The PS 835 repetitions are terminated by an "end of preamble sequence" marker 432.

In order to save power, the wireless LAN system according to embodiments of the present disclosure operates in a reduced bandwidth mode during idle listening until the receiver detects the energy of the preamble sequence 830a in this reduced bandwidth. Idle listening mode occurs whenever the wireless communication device is neither currently receiving nor currently transmitting a portion of a packet. That is, during the period $T_{IDLE}$ that is prior to the period $T_{STF1}$, the network 100 operates in an idle listening mode, such as a reduced bandwidth idle listening mode. The period $T_{IDLE}$ of idle listening mode terminates and the period $T_{STF1}$ commences at the beginning of the first preamble sequence 820 of the STF 800. During the period $T_{STF1}$, in response to detecting the energy of the preamble sequence 803a, the client device continues to operate in the reduced bandwidth mode while receiving the STF first preamble sequence 820. The reduced bandwidth mode reception period $T_{STF1}$ terminates at the end of the last preamble sequence 830b, which includes an end of preamble sequence identifier 432. Also, the period 860 ($T_{STF2}$) of transition from reduced bandwidth to full bandwidth commences at the end of the last preamble sequence 830b, which is the beginning of the second preamble sequence 821 of the STF 800.

While in reduced bandwidth mode, the client device only turns ON a single sub-ADC within the high-speed interleaved ADC and maintains the remaining (n−1) sub-ADCs in an OFF state. In response to receiving the last PS 830b, the client device turns ON all sub-ADCs within the high-speed interleaved ADC. That is, the client device receives initial acquisition on one sub-band, then turns ON all the sub-ADCs for full bandwidth operation. Although initial acquisition on one sub-band is illustrated for ease of explanation, in certain embodiments in which the client device receives initial acquisition on more than one sub-band are within the scope of this disclosure. For example, the client device can receive initial acquisition on one or more sub-bands using one or more sub-ADCs, then turn ON all the sub-ADCs for full bandwidth operation.

FIGS. 9A and 9B illustrate example graphs of power spectral density as a function of bandwidth output by a transmitting wireless communication device according to various embodiments of the present disclosure. The embodiments of the graphs shown in FIGS. 9A-9B are for illustration only. Other embodiments could be used without departing from the scope of the present disclosure.

FIG. 9A illustrates power spectral density as a function of bandwidth for a full bandwidth preamble transmission. The horizontal axis represents bandwidth, and the vertical axis represents power spectral density. During the preamble sequence, such as while receiving the STF 420 and CEF 422 of the preamble 410, the client device uses all sub-ADCs for full bandwidth reception. As the full bandwidth is substantially constant, AP maintains a substantially constant spectral density for transmitting the entire preamble 410. The block 905 shows that while transmitting the full band preamble, such as the STF second preamble sequence 821 and CEF 422, the AP outputs a certain power spectral density over the full bandwidth.

FIG. 9B illustrates power spectral density as a function of bandwidth for a split preamble transmission from an AP or a client device according to embodiments of the present disclosure. More particularly, the differences between block 910 and block 915 show a change in power spectral density (dBm/MHz) for operating the system in the variable bandwidth mode. The power spectral density for the reduced preamble bandwidth is increased by 10*log 10(n) to keep the total power constant out of the transmitter. That is, to keep the area of block 910 equal to the area of the block 915. The transmitter maintains a constant power level output by transmitting the sub-band first part of the preamble sequence at 10*log 10(n) dB higher power (i.e., increased spectral density above the spectral density of block 915) than the power output level of the full bandwidth second part of the preamble sequence represented by block 915.

In this case, the access point 118 implements a variable bandwidth mode and adjusts the power level of transmitted signals such that the power of each part of the split preamble is equivalent even though the bandwidths of each part of the split preamble are different from each other. The AP 118 controls the output power levels to be consistent from the first sub-band preamble to the second full-band preamble.

During the preamble sequence, such as while transmitting the STF first preamble sequence 820 and second preamble sequence 821 of the preamble 810 (or STF 420 and CEF 422 of the preamble 410), the AP uses different numbers of sub-ADCs for multiple bandwidth transmission. More particularly, the block 910 shows that while transmitting the sub-band preamble, namely, STF first preamble sequence 820 (or STF 420), the AP, such as the AP 101-103, has a higher power spectral density over a smaller bandwidth. The block 915 shows that while transmitting the full band preamble, namely second preamble sequence 821 and following CEF, the AP has a lower power spectral density over the full bandwidth. That is, the block 915 has the same dimensions as the block 905 in FIG. 9A.

During the preamble sequence, such as while transmitting the STF 420 and CEF 422 of the preamble 410, the AP uses all sub-ADCs for full bandwidth transmission. As the full bandwidth is substantially constant, AP maintains a substantially constant spectral density for receiving the entire preamble 410. By adjusting the split preamble power for STF1 820 and STF2 821 in embodiments of this disclosure, the receiver detects the same power during the split preamble reception as well.

If regulatory requirements prevent the system from meeting this requirement of the 10*log 10(n) power transmission variation between STF 820 and STF 822, then one solution is to require the access point to transmit more repetitions of PS-A 830 to help the client device with SNR averaging, and an alternative solution is to operate the system at a higher SNR (or reduced operating distance) in the variable bandwidth mode.

FIGS. 10A and 10B illustrate example graphs of channel gain as a function of frequency response within a client device or AP according to various embodiments of the present disclosure. The embodiments of the graphs shown in FIGS. 10A-10B are for illustration only. Other embodiments could be used without departing from the scope of the present disclosure. FIG. 10A shows the impact of sub-band operation on a client device having a single VGA design that operates over the entire bandwidth. FIG. 10B shows the impact of sub-band operation on a client device having a multiple sub-band VGA design.

The client device uses AGC to set the signal to the appropriate level at the input of the ADC, to control the LNA (coarse gain adaptation), and to perform fine gain adaptation (VGA). In the case of time-interleaved ADCs, the client device includes a single VGA for the entire band. In the case of a frequency-interleaved ADC, the client device can include a VGA for each of the sub-bands or have one VGA for the entire band. As shown in FIG. 10B, the client device or AP with multiple VGAs has certain technical advantages, such as an ability to provide performance benefits by adapting the gain on each sub-band independently depending on the coherence bandwidth of the channel. If the coherence bandwidth of the channel is smaller than a sub-band in the reduced bandwidth mode, a single sub-band VGA setting can be used for the entire band.

FIGS. 11A and 11B illustrate timelines of correlator output at various input sampling frequencies according to various embodiments of the present disclosure. The example timelines 1100-1101 shown in FIGS. 11A-11B are for illustration only. Other embodiments could be used without departing from the scope of the present disclosure. The example shown in FIG. 11A illustrates a full bandwidth correlator output over time according to a sampling frequency input speed of $F_s$. The full bandwidth correlator output corresponds to a number samples in a full-band preamble, which has more time resolution than a sub-band correlator.

FIG. 11B shows a sub-band bandwidth correlator output over time according to an equivalent reduced sampling frequency of $F_s/n$. For example, when the number of sub-ADCs is four (n=4), the sub-band correlator outputs four reduced resolution patterns for transmission at the same time.

Figure 12:
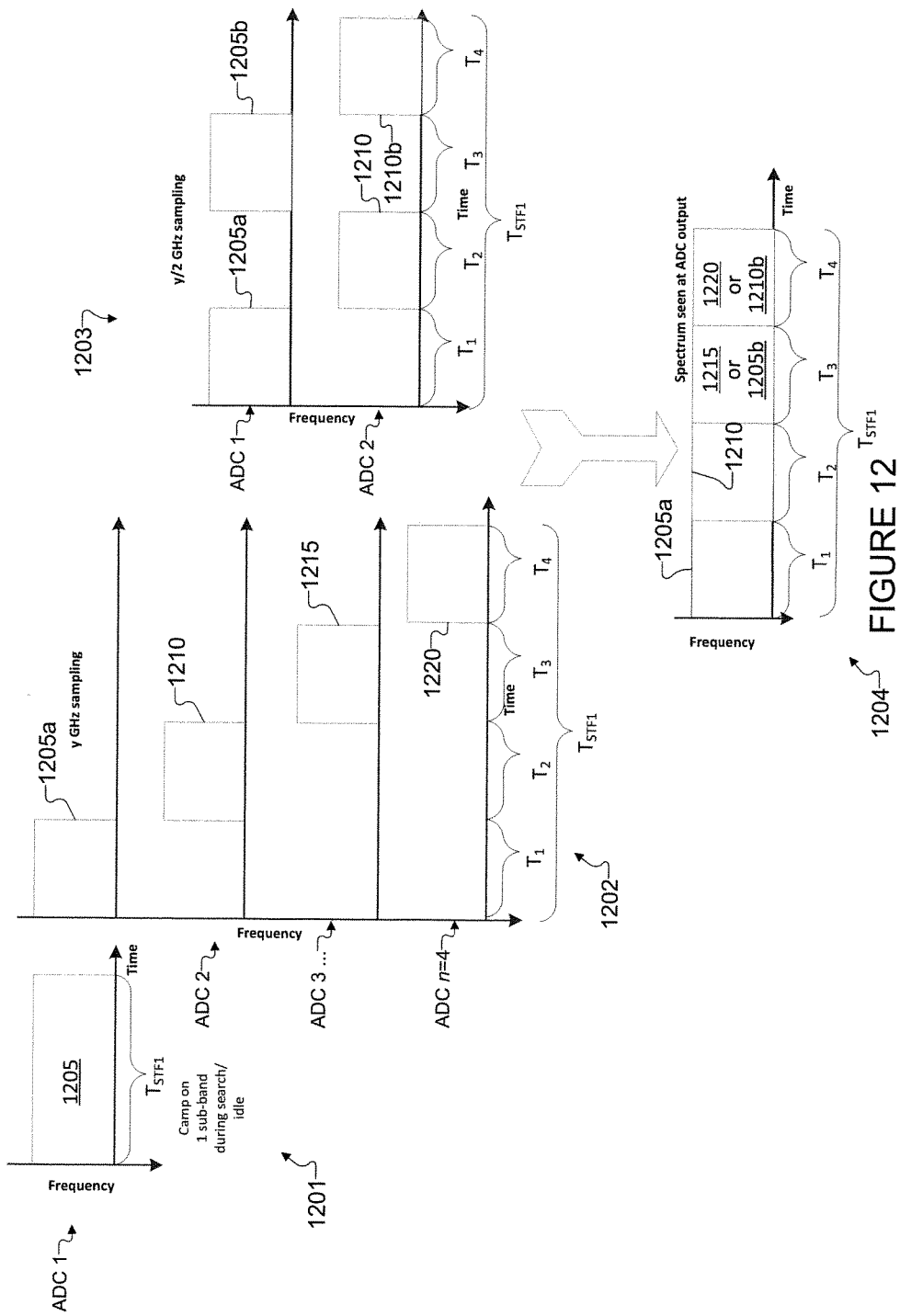
FIG. 12 illustrates a sequence of timelines for a transmission of a multiple bandwidth preamble according to this disclosure.

The timeline 1101 shows that the sub-band correlator output embodies a reduced complexity correlator in the variable bandwidth mode. Only one of the four sub-band correlators can be implemented. That is, a client device implementing the reduced bandwidth idle listening mode provides a technical advantage of enabling an implementation of a lower complexity correlator that runs at a reduced sampling frequency of $F_s/n$ instead of F. As the transmitter synchronizes the transmission of all sub-bands, a single sub-band correlator estimates the symbol timing and the other sub-bands can use the same symbol timing. Any minor sample variations between sub-bands compared to the full-bandwidth mode could be removed by the cyclic prefix used to lessen the channel delay spread variations. The full bandwidth correlator output corresponds to a larger number of samples compared to a sub-band correlator, which is a lower resolution pattern because of the frequency reduction FIG. 12 illustrates various timelines for a transmission of a multiple bandwidth preamble according to embodiments of the present disclosure. The sequences 1201-1204 of transmission shown in FIG. 12 are for illustration only. Other embodiments could be used without departing from the scope of the present disclosure.

A standard, such as an IEEE 802.11 type standard, specifies a fixed starting band for the reduced bandwidth preamble. In other embodiments, as shown in the timelines. The timelines 1201-1204, the starting band is flexible or adjustable, such as in a high-density network wherein the starting bandwidth is crowded and suffers from interference. The starting band is not fixed, but instead, actually hops or changes among multiple sub-bands. That is, the first part of preamble hops among multiple sub-bands instead of staying at a fixed sub-band to reduce interference with the signal transmission and to exploit diversity among sub-bands. A hopping starting band, namely, a starting band that adjusts based on interference levels, provides more robustness to avoid interference in the starting band. In a client device or receiver operation, the receiver waits (for example, camps) on a sub-band until the client device detects the reduced bandwidth preamble. Then the client device joins the hopping sequence for better acquisition. The number of hops is related to the number of sub-bands. For example, in the timeline 1202, a bandwidth of y GHz could have 4 hops, but in the timeline 1203, a bandwidth of y/2 GHz can have half as many hops, that is, 2 hops. The timeline 1204 shows that the output from the ADC would show a constant sequence captured across these multiple hop patterns. In certain embodiments, the hop pattern is randomized to allow multiple hop patterns to co-exist.

As a specific example, the client device or receiver includes four sub-ADCs (n=4) including ADC1, ADC2, ADC3, and ADC4. During a period $T_{STF1}$, the client device or AP operates in the reduced bandwidth mode to execute a respective reception or transmission function. For simplicity, FIG. 12 is described in terms of a client device receiving the sub-band part of a split preamble. In the timeline 1201, the first sub-ADC (ADC1) is turned ON to search or scan for a preamble on a first sub-band, but sub-ADCs 2-4 are turned OFF. During the time $T_{STF1}$, which can be the same as $T_{STF}$, the ADC1 operates using the first sub-band. The client device uses the ADC1 to camp one the first sub-band, to scan the first sub-band in a reduced bandwidth idle listening mode, and then in response to detecting the energy of the sub-band preamble 1205 signal, the client device uses the ADC1 to receive the entire the sub-band preamble 1205 (e.g., first preamble sequence 820 (STF1) of the split STF 810, or STF 420). During $T_{STF1}$, the client device commences and completes synchronization. The height of the block 1205 represents the width of the first sub-band. Similarly, the height of the blocks 1205a, 1210, 1215, 1220 represent the respective widths of the first, second, third, and fourth sub-bands in the case of a y GHz sampling. Similarly, the heights of the blocks 1205a-b and 1210a-b represent the respective widths of the first and second sub-bands in the case of a y/2 GHz sampling. As described more particularly below, during periods $T_1$-$T_4$, the client device executes a synchronization function.

In the timeline 1202, in the case of y GHz sampling, during the period $T_1$, a hopping pattern is used across the entire bandwidth to improve robustness to interference. The client device keeps ADC1 turned ON and keeps the remaining sub-ADCS turned OFF during the period $T_1$. During the period $T_1$, ADC1 receives a first portion 1205a of the STF1, such as one or more preamble sequences (PS-A) 830a, 830, via the first sub-band of the y GHz (for example, having a sub bandwidth of y/4). During period $T_2$, the client device turns OFF ADC1 and turns ON ADC2 and keeps the remaining sub-ADCS turned OFF. During the period $T_2$, ADC2 receives a second portion 1210 of the STF1, such as one or more preamble sequences (PS-A) 830, via the second sub-band. The client device turns OFF ADC2 and turns ON ADC3 and keeps the remaining sub-ADCS turned OFF during the period $T_3$. During the period $T_3$, ADC3 receives a third portion 1215 of the STF1, such as one or more preamble sequences (PS-A) 830, via the third sub-band. The client device turns OFF ADC3 and turns ON ADC4 and keeps the remaining sub-ADCS turned OFF during the period $T_4$. During the period $T_4$, ADC4 receives a fourth portion 1220 of the STF1, such as one or more preamble sequences (PS-A) 830, 830b, via the fourth sub-band. The synchronization period $T_{STF1}$ is substantially equal to the sum of $T_1$, $T_2$, $T_3$, and $T_4$.

Alternatively, as shown in the timeline 1203, in the case of y/2 GHz sampling, a subset of the full bandwidth could be used by the transmitter when other sub-bands suffer from interference. Accordingly, the client device keeps ADC1 turned ON and keeps the other sub-ADC (ADC2) turned OFF during the period $T_1$. During the periods $T_1$ and $T_3$, ADC1 receives first and third portions 1205a-b of the STF1, such as one or more preamble sequences (PS-A) 830a, 830. During the periods $T_2$ and $T_4$, ADC2 receives second and fourth portions 1210, 1210b of the STF1, such as one or more preamble sequences (PS-A) 830, 830b.

The timeline 1204 shows that during periods $T_1$-$T_4$, the interleaved ADC output includes portions of the preamble, wherein each portion was transmitted on a different sub-band than an adjacent or neighboring portion. That is, the AP transmits the first through fourth portions of the STF1 to ADC1-4 via the first through fourth subbands during periods $T_1$-$T_4$, respectively. That is, the AP exploits frequency diversity during reduced bandwidth synchronization for interference mitigation.

In certain embodiments, instead of switching the multiple sub-ADCs ON and OFF during synchronization to exploit frequency diversity, the client device or AP exploits frequency diversity during reduced bandwidth synchronization by using a multiplexer to control a subset of the multiple sub-ADCs. For example, if the ADC1 is the subset of ADCs, then the client device can turn OFF ADC2-ADC4 during the entire $T_{STF1}$, and meanwhile control the ADC1 to receive: (1) portion 1205a of the STF1 via the first sub-band during $T_1$; (2) portion 1210 of the STF1 via the second sub-band during $T_2$; (3) portion 1215 of the STF1 via the third sub-band during $T_3$; and (4) portion 1220 of the STF1 via the fourth sub-band during $T_4$. In a similar manner, the AP can transmit various portions of the preamble sequences using a subset of its multiple sub-ADCs in a multiplexed manner.

Although reduced bandwidth mode frequency hopping is described in reference to the split preamble, the client device or AP can also implement reduced bandwidth mode frequency hopping to respectively receive or transmit a payload. That is, the AP can use a first sub-band to transmit one symbol of a payload and can use a difference sub-band to transmit another symbol of the same payload. As described above, the AP can assign one sub-band per sub-ADC and switch the sub-ADCs ON and OFF at different times, or alternatively, the AP can multiplex multiple sub-bands to one sub-ADC (i.e., a subset of the multiple ADCs) and switch the assignment of different sub-bands to the one sub-ADC at different times. According to embodiments of the present disclosure, the payload can be transmitted at a full bandwidth, such as a 2 GHz sampling or at a reduced bandwidth, such as a 1 GHz sampling.

Figure 13:
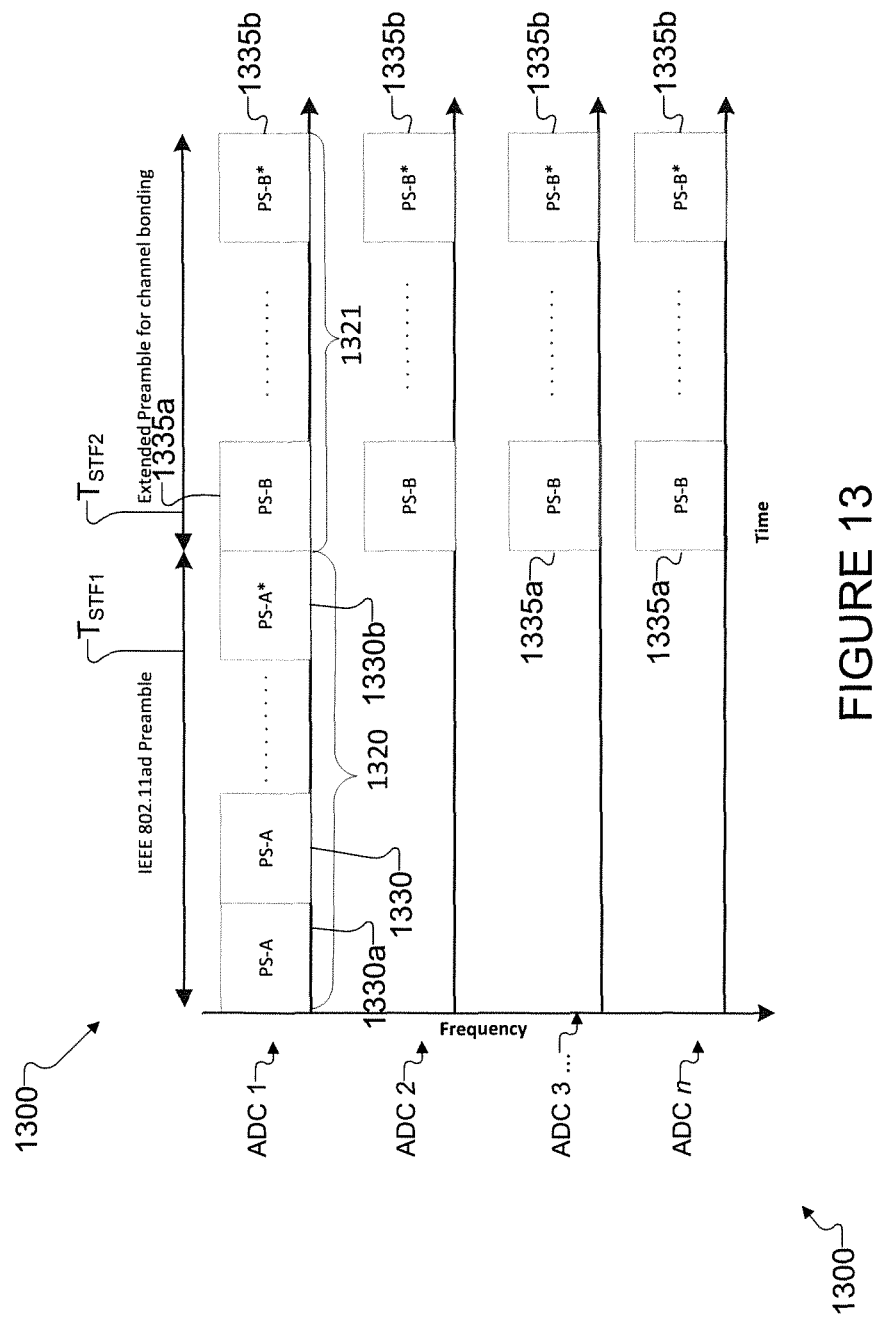
FIG. 13 illustrates a synchronization operation in a channel bonding mode according to this disclosure.

FIG. 13 illustrates a synchronization operation in a channel bonding mode according to this disclosure. The embodiment of the synchronization operation 1300 shown in FIG. 13 is for illustration only. Other embodiments could be used without departing from the scope of the present disclosure.

The variable bandwidth mode implementations of this disclosure can be used for synchronization in a channel bonding mode for a future extension of IEEE 802.11ad with larger bandwidths. The period ($T_{STF1}$) shows that in this example, the IEEE 802.11ad 2.16 GHz band can be considered as a sub-band, a PS-A 1330a, 1330, 1330b can be 802.11ad preamble sequence (128-length Golay sequence). That is, the period ($T_{STF1}$) is an IEEE 802.11ad preamble. The period $T_{STF1}$) during the STF second preamble sequence shows that, in extended bandwidth mode, the access point extends the PS-A by adding PS-B1335a, 1335b, which is a new sequence, preferably another 128-length Golay sequence with low cross-correlation to PS-A. That is, the period $T_{STF1}$ corresponds to an extended preamble for channel bonding. The AP changes the PS-B 1335 depending on the number of channels to be bonded. As described more particularly above in reference to FIG. 9B, the total power needs to be kept constant to accommodate a bandwidth change.

Figure 14:
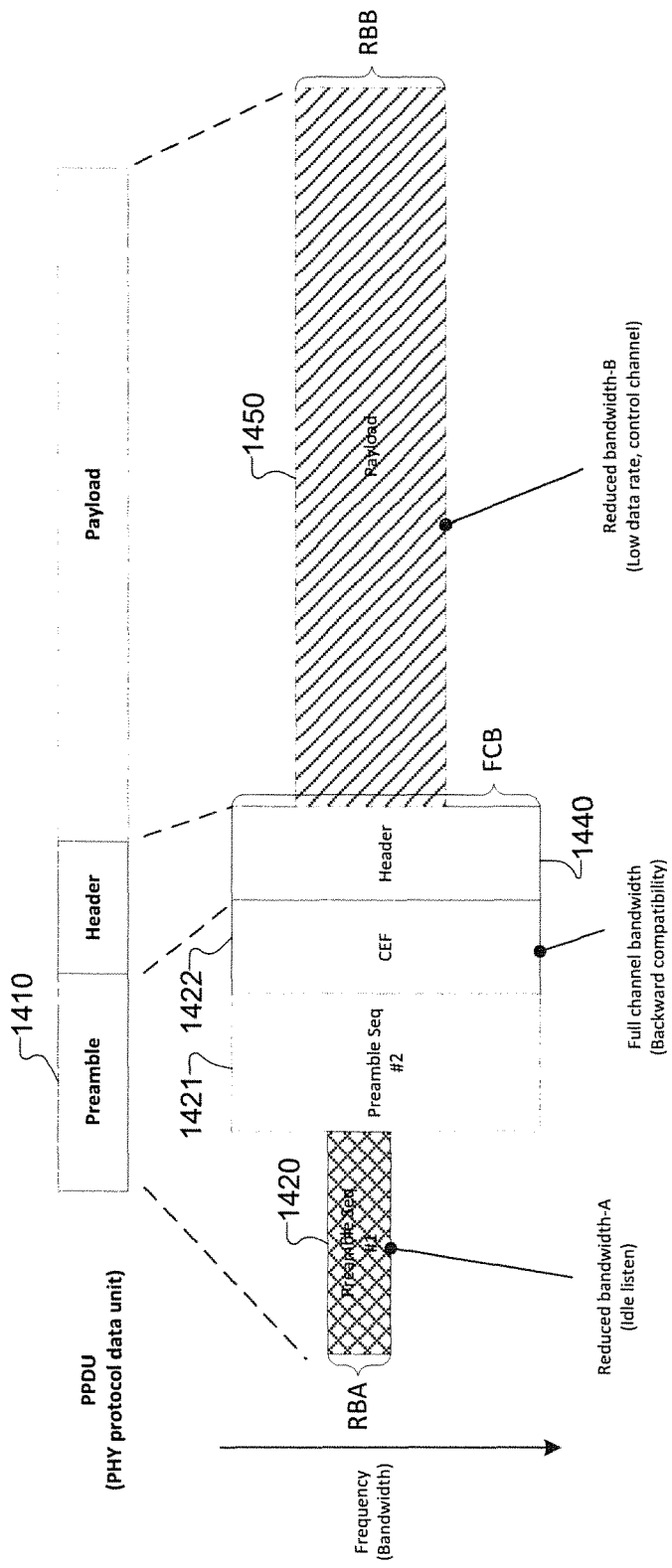
FIG. 14 illustrates a packet of wireless LAN system having multiple bandwidths for each portion of the packet according to this disclosure.

FIG. 14 illustrates a packet of wireless LAN system having multiple bandwidths for each portion of the packet according to the present disclosure. The embodiment of the packet 1400 shown in FIG. 14 is for illustration only. Other embodiments could be used without departing from the scope of the present disclosure.

The packet 1400 is a self-contained unit containing the preamble, header, and payload. The packet 1400 includes a preamble 1410, a header 1440 and a payload 1450. As shown in FIG. 14, the preamble 410 is transmitted over a smaller bandwidth than the data payload. In FIG. 14, the vertical dimension or height of a block represents bandwidth over which information within that block is transmitted, and the blocks representing header 1440 and payload 1450 have different and greater heights than the blocks 1420-1422 representing the preamble 1410. Specifically, as defined in this disclosure, the first preamble sequence 1420 has a smaller bandwidth RBA (shown as reduced-bandwidth A) than the second preamble sequence 1421, which as a full channel bandwidth (FCB) to enable power savings during idle listen by turning off sub-ADCs.

The CEF 1422 of the preamble 1410 and header 1440 are the same as or similar to the CEF 422 and header 440 of FIG. 4. That is, the second preamble sequence 1421, CEF 1422, and header 1440 are transmitted at the full channel bandwidth.

The bandwidth of the Presentation Protocol Data Unit (PPDU) transmission is adjustable to between the reduced bandwidth of the first preamble sequence 1420 and the full channel bandwidth of the header 1440. The reduced preamble 1420 can be used to save power of the ADC during idle listening mode. The AP or STA sends the channel estimation field 1422 and headers 1440 at full bandwidth for backward compatibility to existing systems. That is, by transmitting the header 1440 at full bandwidth, the AP or STA implements a backwards compatible packet transmission. The AP or STA transmits the payload at a reduced bandwidth for low data rate or control information (such as acknowledgments). When the AP implements a variable bandwidth mode of operation, all but one (or for example, at least one) of the sub-ADCs and associated circuitry at the client device receiver can be turned OFF to save power. The AP can indicate a starting location of the payload 1450 and the bandwidth RBB (shown as reduced-bandwidth B) used for the payload 1450 in the header 1440. As a technical advantage of flexibility, the reduced bandwidth for the first preamble sequence 1420 can be different from or the same as the bandwidth for the payload 1450 by varying the number of sub-ADCs that are turned ON or OFF.

Figure 15:
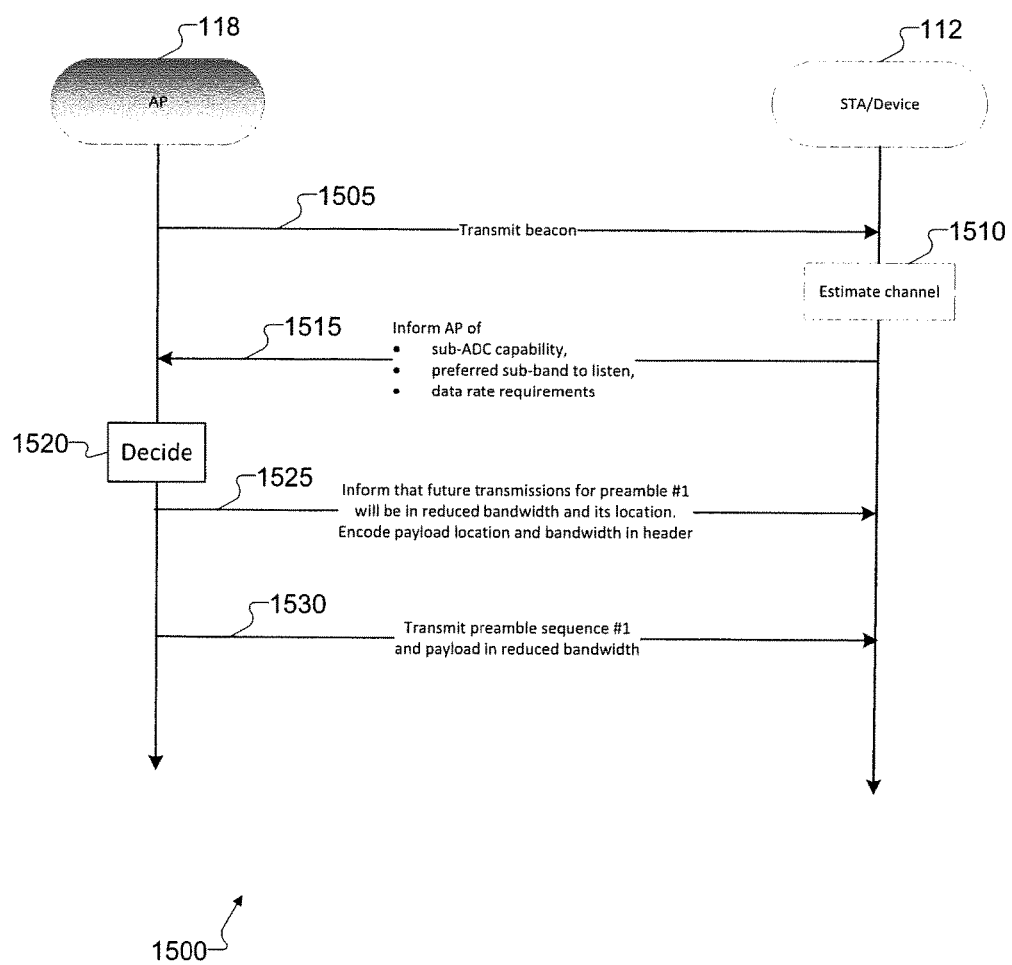
FIG. 15 illustrates communication process for implementing a multiple bandwidth preamble to enable low power synchronization for large bandwidth wireless LAN systems according to this disclosure

FIG. 15 illustrates communication process for implementing a multiple bandwidth preamble to enable low power synchronization for large bandwidth wireless LAN systems according to embodiments of the present disclosure. The embodiment of the process 1500 shown in FIG. 15 is for illustration only. Other embodiments could be used without departing from the scope of the present disclosure.

The example illustrated in FIG. 15 shows a communication exchange between the AP 118 and the STA 112 or client device to establish a reduced bandwidth operation in a backward compatible mode, such as an implementation with hardware configured for IEEE 802.11ad standard operations. In other words, the AP 118 and the STA 112 implement a method for low power synchronization in a packer-based communication system that has a large bandwidth. In the process 1500, the bandwidth of the preamble or synchronization sequence is varied during synchronization, wherein the AP 118 transmits over and/or the STA 112 receives with the varied bandwidths. In the operation 1505, the AP 118 transmits a beacon over the entire full channel bandwidth, and the STA 112 receiver receives the beacon. In operation 1510, the STA 112 uses the beacon to estimate the channel. In operation 1515, the STA 112 transmits an uplink notification to the AP 118. The uplink notification indicates to the AP certain capabilities of the STA, such as reduced bandwidth support using sub-ADCs, the sub-ADC bandwidth, a preferred sub-band to use for idle listening based on the received channel estimate, and the application data rate requirements. In operation 1520, the AP 118 decides to use the reduced bandwidth operation to reduce receiver power consumption. In certain cases, the AP 118 can decide to not use variable bandwidth mode. In operation 1525, the AP 118 transmits a notification that indicates to or otherwise informs the STA 112 that future transmissions will use such a variable bandwidth mode of operation. In operation 1530, the AP118 transmits a preamble and data payload transmission in the variable bandwidth mode.

Figure 16:
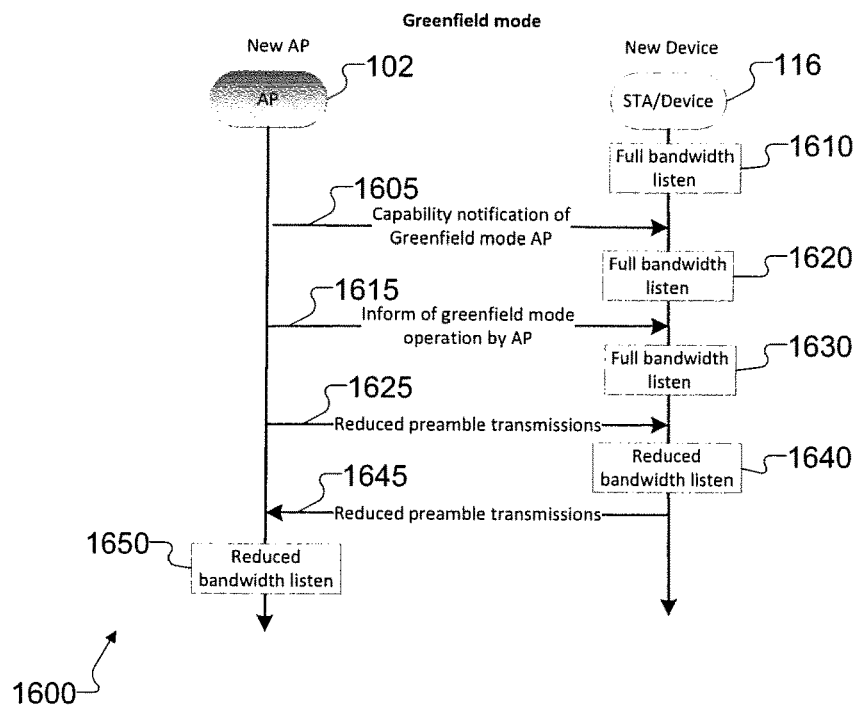
FIG. 16 illustrates a process for implementing a Greenfield mode according to this disclosure.
Figure 17:
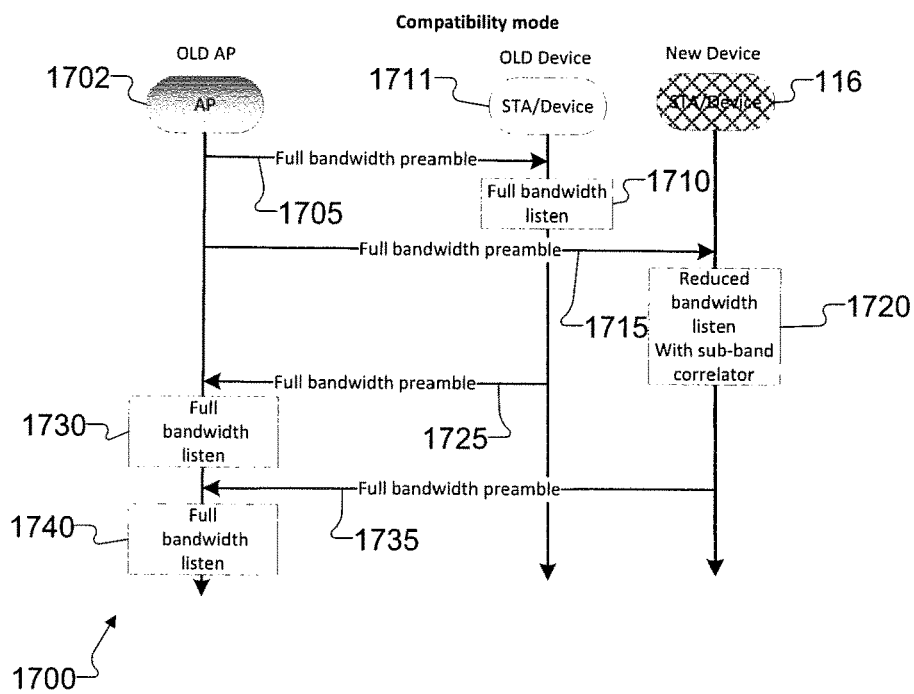
FIG. 17 illustrates a process for implementing a Compatibility mode according to this disclosure.

FIGS. 16 and 17 illustrate processes for a wireless communication network to implement a variable bandwidth mode based on various AP hardware implementations. The embodiments of the processes 1600 and 1700 shown in FIGS. 16-17 are for illustration only. Other embodiments could be used without departing from the scope of the present disclosure. As described above, hardware configured for the IEEE 802.11ad standard is compatible with, and can be used to implement, a multiple bandwidth preamble to enable low power synchronization for large bandwidth wireless LAN systems according to the embodiments of the present disclosure. For example, IEEE 802.11ad compatible ADCs built with multiple sub-ADCs can implement both IEEE 802.11ad as well as the variable bandwidth mode according to embodiments of the present disclosure. For example, four 440 MHz sub-ADCs can be used to build a 1.76 GHz ADC. The 32-length Golay correlator can be implemented with negligible overhead compared to 128-length Golay only implementation.

FIG. 16 illustrates a process 1600 for the wireless communication network 100 to implement a variable bandwidth mode based on a "Greenfield mode" AP hardware implementation. As a specific hardware implementation example, a "Greenfield mode" is a case wherein all client devices 116 and the AP 102 support variable bandwidth mode. During device discovery/association, the AP 102 checks or otherwise receives notification that all associated client devices support the variable bandwidth mode. That is, during discovery As IEEE 802.11ad is a beamformed system with reduced operating range, there is a high probability for Greenfield mode occurrence. The AP sends a message that the AP will transmit a preamble in variable bandwidth mode. In response, the client devices turn OFF a subset (for example, all except one) sub-ADCs until the reduced bandwidth 32-length preamble is detected by the sub-ADC allowed to remain turned ON during the reduced bandwidth idle listening mode. There is no performance loss in the Greenfield mode for AWGN.

During device discovery/association, the AP 102 transmits a capability notification 1605 to the STA 116 indicating that the AP 102 implements the variable bandwidth mode transmissions, namely, the Greenfield mode. A Greenfield mode AP is configured to transmit a split preamble using a reduced bandwidth to transmit the first preamble sequence (STF or STF1), thereby helping STAs in the coverage area 120 to reduce power consumption during idle listening, synchronization, and payload. The STA 116 uses full bandwidth idle listening mode 1610 to receive the capability notification 1605.

The AP 102 transmits a Greenfield mode notification 1615 after sending the capability notification 1605. The Greenfield mode notification 1610 indicates that the AP will transmit a preamble in a reduced bandwidth mode that is part of the variable bandwidth mode. The STA 116 uses full bandwidth idle listening mode 1620 to receive the Greenfield mode notification 1615.

The AP 102 transmits one or more variable bandwidth packets 1625 after sending the Greenfield mode notification 1615. The STA 116 uses full bandwidth idle listening mode 1630 to receive the first variable bandwidth packet 1625. The STA 116 uses reduced bandwidth idle listening mode 1640 to receive the subsequent variable bandwidth packets. As an example, the AP 102 transmits the sub-band part of a split preamble using the first sub-band, and in response, the STA 116 receives the sub-band part of the split preamble using the first sub-band. The AP 102 can provide advanced notification to the STA 116 of the parameters defining the sub-band through which the sub-band part of the split preamble will be transmitted.

The STA 116 transmits variable bandwidth packets 1645 to the AP using a split preamble having a sub-band part followed by a full bandwidth part. The AP uses reduced bandwidth idle listening mode 1650 to receive the variable bandwidth packets 1645 from the STA 116.

FIG. 17 illustrates a "Compatibility mode" process 1700 for the wireless communication network 100 to implement a variable bandwidth mode based on a legacy AP hardware implementation. As another specific hardware implementation example, a "Compatibility mode" is a case wherein at least some of the client devices 116 support variable bandwidth mode, but the associated AP 1702 does not support variable bandwidth mode, and the AP 1702 may be associated with legacy client devices 1711 that do not support variable bandwidth mode. The AP 1702 transmits in IEEE 802.11ad mode. That is, the AP 1702 transmits the preamble 1705 using a full bandwidth, such as transmitting the preamble 410. Legacy client devices 1711 receive the full bandwidth preamble 1705 using full bandwidth idle listening mode 1710 and transmit packets to the AP 1702 using a full bandwidth preamble 1725. The AP 1702 receives packets from the legacy STA 1711 using full bandwidth idle listening mode 1730. However, client devices 116 supporting low bandwidth mode may not be able to detect the full bandwidth preamble 1705. The AP 1702 transmits a subsequent full bandwidth preamble 1715. Client devices 116 supporting low bandwidth mode are able to detect the full bandwidth preamble 1715 in variable bandwidth mode with performance degradation. The performance degradation results from the fact that the sub-ADC turned ON in the client device 116 only receives signals in a sub-band and will consequently only capture a fraction of the total power over the full band. The full-band Golay correlator is not optimal for receiving the sub-band filtered sequence at the receiver. The client device 116 can include a new correlator 1720 to match the sub-band filtered 128-length Golay sequence. This new correlator is also real, but the new correlator is no longer a binary sequence and requires higher complexity, indicating a need for multipliers for implementation, than the 128-length Golay correlator that includes adders for implementation. Additionally, for the compatibility mode, time-interleaved ADCs will require further filtering to ensure there are no aliases in the sub-band. A frequency-interleaved ADC does not require further filtering. Client devices that have high SNR can make use of this compatibility mode.

After processing the full bandwidth preamble 1715, the STA 116 can transmits packets to the AP 1702 using a full bandwidth preamble 1735. The AP 1702 receives packets from the STA 116 using full bandwidth idle listening mode 1740.

As a specific hardware implementation example, certain embodiments implementing a low power synchronization scheme for large bandwidth wireless LAN systems using a variable bandwidth mode have demonstrated that this scheme can provide 33% power savings in idle listening assuming 50% power consumption due to the ADC, while having no degradation in AWGN and a 0.8 dB loss in a fading NLOS conference room scenario. A single sub-band AGC has been demonstrated to be sufficient to provide an estimate for the entire band because the coherence bandwidth is smaller than the sub-band in this scheme. A single correlator operating over the reduced bandwidth is sufficient for timing estimation, lowering the complexity further. The low PAPR in this scheme provides additional benefits for data such as reduced ADC precision at the receiver and the transmitter PA back-off. The embodiments of this disclosure have demonstrated a backward compatibility with IEEE 802.11ad suitable for high SNR devices. The embodiments of this disclosure are scalable for low power synchronization in future large bandwidth wireless LAN systems.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiver configured to communicate in a packet-based communication system, the receiver comprising:
    an antenna configured to receive a packet modulated on an RF signal, the packet comprising a two-part preamble, a header and a payload;
    an analog-to-digital converter (ADC) including multiple sub-ADCs, wherein the multiple sub-ADCs within the ADC are interleaved and the multiple sub-ADCs are one of: time-interleaved sub-ADCs or frequency-interleaved sub-ADCs; and processing circuitry coupled to the antenna and ADC, the processing circuitry configured to:
turn on a first subset of the multiple sub-ADCs during an idle listening period,
detect a preamble sequence corresponding to a first part of the two-part preamble using the first subset of the multiple sub-ADCs during the idle listening period, and
turn on a second subset of the multiple sub-ADCs upon detection of a completion of the first part of the two-part preamble, wherein the first subset of the multiple sub-ADCs is less than the second subset of the multiple sub-ADCs.

2. The receiver of claim 1, wherein the processing circuitry is configured to switch one or more of the multiple sub-ADCs from an idle, standby or off state to an on state within at least one of: a duration of a sample or a duration of a symbol.

3. The receiver of claim 1, wherein the processing circuitry is configured to turn on the second subset of ADCs upon detection of an end of preamble marker included in the first part of the two-part preamble.

4. The receiver of claim 1, wherein the processing circuitry is configured to cause the antenna to use a hopping pattern to listen for the first part of the two-part preamble among multiple sub-bands.

5. The receiver of claim 1, wherein the processing circuitry is further configured to:
turn on a third subset of the multiple sub-ADCs upon detection of a beginning of at least one of a beginning of the header and a beginning of the payload of the packet, wherein the third subset of the multiple sub-ADCs is less than the second subset of the multiple sub-ADCs.

6. The receiver of claim 1, wherein the processing circuitry is configured to receive, via the antenna, a beacon configured to indicate one or more of: a reduced bandwidth; a location of the first part of the two-part preamble; and a hopping pattern of the first part of the two-part preamble.

7. The receiver of claim 1, wherein a power of signals received from a transmitting wireless device is adjusted to ensure that the signals processed by the processing circuitry are in a correct operating range for operating the ADC while bandwidth is varied during packet transmission, wherein the received signals include the received packet.

8. The receiver of claim 1, wherein the processing circuitry is further configured to determine initial synchronization of the receiver with a source of the packet.

9. A receiver configured to communicate in a packet-based communication system, the receiver comprising:
an antenna configured to receive a packet modulated on an RF signal, the packet comprising a split preamble, a header and a payload at a full transmission bandwidth; and
an analog-to-digital converter (ADC) including multiple sub-ADCs, wherein the multiple sub-ADCs within the ADC are interleaved and the multiple sub-ADCs are one of: time-interleaved sub-ADCs or frequency-interleaved sub-ADCs; and
processing circuitry coupled to the antenna and the ADC, the processing circuitry configured to:
turn on a first subset of the multiple sub-ADCs while keeping remaining sub ADCs turned off to capture only a fraction of the full transmission bandwidth during synchronization to save power in an idle listening mode, and
operate in the idle listening mode until detecting energy of a preamble sequence corresponding to a first part of the split preamble using the first subset of the multiple sub-ADCs.

* * * * *